United States Patent
Yin et al.

(10) Patent No.: US 11,166,262 B2
(45) Date of Patent: Nov. 2, 2021

(54) LONG PHYSICAL UPLINK CONTROL CHANNEL (PUCCH) DESIGN FOR 5TH GENERATION (5G) NEW RADIO (NR)

(71) Applicants: Sharp Kabushiki Kaisha, Sakai (JP); FG Innovation Company Limited, Hong Kong (CN)

(72) Inventors: Zhanping Yin, Vancouver, WA (US); Toshizo Nogami, Vancouver, WA (US)

(73) Assignees: FG Innovation Company Limited, Hong Kong (HK); Sharp Kabushiki Kaisha, Osaka (JP)

( * ) Notice: Subject to any disclaimer, the term of this patent is extended or adjusted under 35 U.S.C. 154(b) by 17 days.

(21) Appl. No.: 15/862,001

(22) Filed: Jan. 4, 2018

(65) Prior Publication Data

US 2018/0192417 A1    Jul. 5, 2018

Related U.S. Application Data

(63) Continuation of application No. PCT/US2018/012241, filed on Jan. 3, 2018.
(Continued)

(51) Int. Cl.
*H04W 72/04* (2009.01)
*H04L 5/00* (2006.01)
(Continued)

(52) U.S. Cl.
CPC ....... *H04W 72/0413* (2013.01); *H04L 1/1607* (2013.01); *H04L 1/1812* (2013.01);
(Continued)

(58) Field of Classification Search
CPC .. H04W 72/0413; H04L 5/0053; H04L 5/005; H04L 1/1812; H04L 1/1861; H04L 5/0051

See application file for complete search history.

(56) References Cited

U.S. PATENT DOCUMENTS

2005/0036441 A1* 2/2005 Laroia ............... H04L 27/362
370/203
2007/0211657 A1* 9/2007 McBeath .......... H04W 72/0446
370/329

(Continued)

FOREIGN PATENT DOCUMENTS

| CN | 103716891 A | 12/2013 |
| CN | 105594286 A | 9/2014 |
| EP | 3076732 A1 | 10/2016 |

OTHER PUBLICATIONS

Ericsson, "Summary of e-mail discussions on uplink control signaling", 3GPP TSG-RAN WG1 #87, Reno, NV, USA, R1-1613162, Nov. 18, 2106.

(Continued)

*Primary Examiner* — Christine Ng
(74) *Attorney, Agent, or Firm* — Imperium Patent Works

(57) ABSTRACT

A user equipment (UE) is described. The UE includes a processor and memory in electronic communication with the processor. Instructions stored in the memory are executable to acquire a first higher layer configuration indicating at least a long uplink control channel (PUCCH) resource configuration. The instructions are also executable to acquire a second higher layer configuration indicating multiple sets of PUCCH resource configurations. One set of PUCCH resource configurations within the multiple sets of PUCCH resource configurations include the long PUCCH resource configuration. The instructions are further executable to select a set of PUCCH resource configurations from the sets of PUCCH resource configurations based on a payload size of uplink control information (UCI). The instructions are additionally executable to transmit the UCI on a PUCCH resource, the PUCCH resource corresponding to a PUCCH resource configuration within the selected set of PUCCH resource configurations.

10 Claims, 30 Drawing Sheets

Related U.S. Application Data

(60) Provisional application No. 62/442,883, filed on Jan. 5, 2017.

(51) Int. Cl.
  *H04L 1/18* (2006.01)
  *H04L 1/16* (2006.01)
(52) U.S. Cl.
  CPC ............ *H04L 1/1861* (2013.01); *H04L 5/005* (2013.01); *H04L 5/0053* (2013.01); *H04L 5/0007* (2013.01); *H04L 5/0051* (2013.01); *H04L 5/0094* (2013.01)

(56) References Cited

U.S. PATENT DOCUMENTS

| | | | | |
|---|---|---|---|---|
| 2010/0265874 | A1* | 10/2010 | Palanki | H04L 5/005 370/315 |
| 2013/0343322 | A1* | 12/2013 | Lee | H04J 13/004 370/329 |
| 2014/0161060 | A1 | 6/2014 | Nam et al. | H04W 52/10 370/329 |
| 2015/0092702 | A1 | 4/2015 | Chen et al. | H04W 72/04 370/329 |
| 2015/0237644 | A1* | 8/2015 | Golitschek Edler von Elbwart | H04W 72/042 370/329 |
| 2016/0028511 | A1 | 1/2016 | Papasakellariou et al. | H04W 72/04 370/329 |
| 2016/0219560 | A1* | 7/2016 | Chen | H04W 72/0446 |
| 2016/0226639 | A1* | 8/2016 | Xiong | H04L 1/08 |
| 2017/0164335 | A1* | 6/2017 | Yamamoto | H04L 5/0092 |
| 2018/0027554 | A1* | 1/2018 | Yerramalli | H04L 1/0009 370/329 |
| 2018/0091287 | A1* | 3/2018 | Ly | H04L 5/0053 |
| 2018/0167933 | A1* | 6/2018 | Yin | H04L 5/0055 |
| 2018/0176909 | A1* | 6/2018 | Wikstrom | H04W 72/042 |
| 2018/0294938 | A1* | 10/2018 | Munier | H04L 5/0051 |
| 2019/0159191 | A1* | 5/2019 | Kim | H04W 72/0406 |

OTHER PUBLICATIONS

Huawei, HiSilicon et al., "WF on PUCCH channelization", 3GPP TSG RAN WG1 Meeting #87, Reno, USA, R1-1613636, Nov. 18, 2016.

LG Electronics et al., "WF on Long Duration PUCCH", 3GPP TSG RAN WG1 #87, Reno, USA, R1-1613411, Nov. 18, 2016.

LG Electronics, "Design of long duration UL control channel for NR", 3GPP TSG RAN WG1 Meeting #87, Reno, USA, R1-1611844, Nov. 18, 2016.

Intel Corporation, "UL control channel design with long duration", 3GPP TSG-RAN WG1 #87, Reno, USA, R1-1611995, Nov. 18, 2016.

Qualcomm Incorporated, "UL channelization in long UL duration", 3GPP TSG-RAN WG1 #87, Reno, USA, R1-1612074, Nov. 18, 2016.

Nokia, Alcatel-Lucent Shanghai Bell, "On the PUCCH structure for NR", 3GPP TSG RAN WG1 #87, Reno, USA, R1-1612238, Nov. 18, 2016.

Mitsubishi Electric, "On common UL control design between DFT-S-OFDM and OFDM", 3GPP TSG-RAN WG1 #87, Reno, Nevada, USA, R1-1612376, Nov. 18, 2016.

Samsung, "UL Control Channel Design", 3GPP TSG RAN WG1 #87, Reno, USA, R1-1612529, Nov. 18, 2016.

InterDigital Communications, "A common framework for control channel design for NR", 3GPP TSG RAN WG1 Meeting #87, Reno, USA, R1-1612645, Nov. 18, 2016.

NTT Docomo, Inc., "UL control channel for NR", 3GPP TSG RAN WG1 #87, Reno, USA, R1-1612718, Nov. 18, 2016.

Ericsson, "On long UCI without simultaneous data transmission", 3GPP TSG-RAN WG1 #87, Reno, NV, USA, R1-1612919, Nov. 18, 2016.

International Search Report and Written Opinion issued for PCT Application No. PCT/US2018/012241 dated Apr. 5, 2018.

3GPP "Status Report for RAN WG1 to TSG-RAN #74", 3GPP TSG RAN #74, Vienna, Austria, RP-161937, Dec. 8, 2016.

R1-155580, "Remaining details on design of new PUCCH format," 3GPP TSG-RAN WG1 Meeting #82bis, Nokia Networks, Oct. 9, 2015, Malmö, Sweden.

Office action of the Chinese Patent Office in foreign related application CN201880005893.5 dated May 24, 2021 (6 pages).

* cited by examiner

Example 1: 2 RS per RB in frequency domain

Example 2: 3 RS per RB in frequency domain

Example 3: 4 RS per RB in frequency domain b) frequency hopping within 7 symbols for NCP a) frequency hopping at slot or every 7 symbols for NCP

LONG PHYSICAL UPLINK CONTROL CHANNEL (PUCCH) DESIGN FOR 5TH GENERATION (5G) NEW RADIO (NR)

RELATED APPLICATIONS

This application is related to and claims priority from U.S. Provisional Patent Application No. 62/442,883, entitled "LONG PHYSICAL UPLINK CONTROL CHANNEL (PUCCH) DESIGN FOR 5th GENERATION (5G) NEW RADIO (NR)," filed on Jan. 5, 2017, which is hereby incorporated by reference herein, in its entirety.

TECHNICAL FIELD

The present disclosure relates generally to communication systems. More specifically, the present disclosure relates to long physical uplink control channel (PUCCH) design for 5th generation (5G) new radio (NR).

BACKGROUND

Wireless communication devices have become smaller and more powerful in order to meet consumer needs and to improve portability and convenience. Consumers have become dependent upon wireless communication devices and have come to expect reliable service, expanded areas of coverage and increased functionality. A wireless communication system may provide communication for a number of wireless communication devices, each of which may be serviced by a base station. A base station may be a device that communicates with wireless communication devices.

As wireless communication devices have advanced, improvements in communication capacity, speed, flexibility and/or efficiency have been sought. However, improving communication capacity, speed, flexibility and/or efficiency may present certain problems.

For example, wireless communication devices may communicate with one or more devices using a communication structure. However, the communication structure used may only offer limited flexibility and/or efficiency. As illustrated by this discussion, systems and methods that improve communication flexibility and/or efficiency may be beneficial.

DETAILED DESCRIPTION

Figure 1:
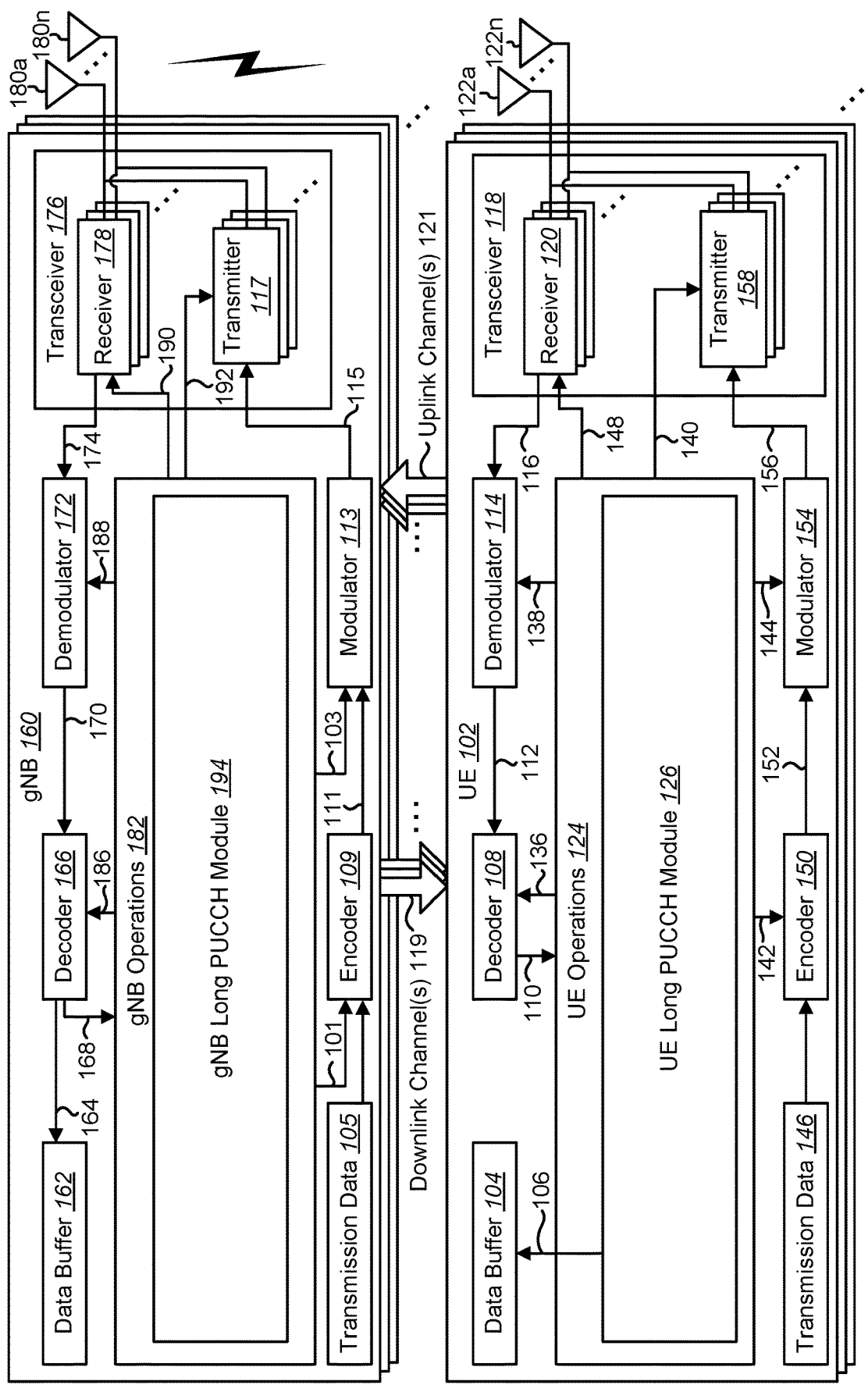
FIG. 1 is a block diagram illustrating one implementation of one or more base stations (gNBs) and one or more user equipments (UEs) in which systems and methods for long physical uplink control channel (PUCCH) design for 5th generation (5G) new radio (NR) may be implemented.

A user equipment (UE) is described. The UE includes a processor and memory in electronic communication with the processor. Instructions stored in the memory are executable to acquire a first higher layer configuration indicating at least a long uplink control channel (PUCCH) resource configuration. The instructions are also executable to acquire a second higher layer configuration indicating multiple sets of PUCCH resource configurations. One set of PUCCH resource configurations within the multiple sets of PUCCH resource configurations include the long PUCCH resource configuration. The instructions are further executable to select a set of PUCCH resource configurations from the sets of PUCCH resource configurations based on a payload size of uplink control information (UCI). The instructions are additionally executable to transmit the UCI on a PUCCH resource, the PUCCH resource corresponding to a PUCCH resource configuration within the selected set of PUCCH resource configurations.

The first higher layer configuration may include at least a number of symbols, a number of resource blocks (RBs), and whether frequency hopping is applied. If a long PUCCH spans over multiple slots and if an inter-slot frequency hopping is configured, the inter-slot frequency hopping may be applied at every slot boundary.

A base station is also described. The base station includes a processor and memory in electronic communication with the processor. Instructions stored in the memory are executable to send a first higher layer configuration indicating at least a long uplink control channel (PUCCH) resource configuration. The instructions are also executable to send a second higher layer configuration indicating multiple sets of PUCCH resource configurations. One set of PUCCH resource configurations within the multiple sets of PUCCH resource configurations include the short PUCCH resource configuration. The instructions are further executable to select a set of PUCCH resource configurations from the sets of PUCCH resource configurations based on a payload size of uplink control information (UCI). The instructions are additionally executable to receive the UCI on a PUCCH resource, the PUCCH resource corresponding to a PUCCH resource configuration within the selected set of PUCCH resource configurations.

A method for a user equipment (UE) is also described. The method includes acquiring a first higher layer configuration indicating at least a long uplink control channel (PUCCH) resource configuration. The method also includes acquiring a second higher layer configuration indicating multiple sets of PUCCH resource configurations, one set of PUCCH resource configurations within the multiple sets of PUCCH resource configurations include the long PUCCH resource configuration. The method further includes selecting a set of PUCCH resource configurations from the sets of PUCCH resource configurations based on a payload size of uplink control information (UCI). The method additionally includes transmitting the UCI on a PUCCH resource, the PUCCH resource corresponding to a PUCCH resource configuration within the selected set of PUCCH resource configurations.

A method for a base station is also described. The method includes sending a first higher layer configuration indicating at least a long uplink control channel (PUCCH) resource configuration. The method also includes sending a second higher layer configuration indicating multiple sets of PUCCH resource configurations, one set of PUCCH resource configurations within the multiple sets of PUCCH resource configurations include the long PUCCH resource configuration. The method further includes selecting a set of PUCCH resource configurations from the sets of PUCCH resource configurations based on a payload size of uplink control information (UCI). The method additionally includes receiving the UCI on a PUCCH resource, the PUCCH resource corresponding to a PUCCH resource configuration within the selected set of PUCCH resource configurations.

Another user equipment (UE) is described. The UE includes a processor and memory in electronic communication with the processor. Instructions stored in the memory are executable to determine the uplink control channel (PUCCH) format and configuration based on a signaling from a gNB. The instructions are also executable to determine the control channel used for uplink control information (UCI) feedback. The instructions are further executable to determine the resource of the control channel for UCI feedback. The instructions are additionally executable to transmit UCI on the selected channel.

Determining the uplink control channel (PUCCH) format and configuration may include at least a short PUCCH format and a long PUCCH format. The short PUCCH format and long PUCCH format may have the same or different waveforms and/or numerologies.

A long PUCCH may employ a format that includes a waveform, a number of resource blocks (RBs), a reference symbol (RS) pattern, and/or orthogonal sequences on RS and data symbols, and/or one or more control resource regions. The long PUCCH may employ a cyclic prefix Orthogonal Frequency Division Multiplexing (CP-OFDM) or discrete Fourier transform spread OFDM (DFT-S-OFDM) waveform. A common framework may be used on the RS location and UCI multiplexing methods. RS symbols may be allocated at time domain, and orthogonal sequences are applied for UCI data at time domain or frequency domain.

If CP-OFDM is used, RS symbols may be allocated at frequency domain, and orthogonal sequences are applied for UCI data at time domain or frequency domain. If CP-OFDM is used, orthogonal RS patterns may be applied for UE multiplexing.

Another base station (gNB) is also described. The gNB includes a processor and memory in electronic communication with the processor. Instructions stored in the memory are executable to determine an uplink control channel (PUCCH) format and configuration. The instructions are also executable to receive UCI on a selected channel, wherein a control channel used for uplink control information (UCI) feedback and a resource of the control channel for UCI feedback are determined based on signaling from the gNB.

The 3rd Generation Partnership Project, also referred to as "3GPP," is a collaboration agreement that aims to define globally applicable technical specifications and technical reports for third and fourth generation wireless communication systems. The 3GPP may define specifications for next generation mobile networks, systems and devices.

3GPP Long Term Evolution (LTE) is the name given to a project to improve the Universal Mobile Telecommunications System (UMTS) mobile phone or device standard to cope with future requirements. In one aspect, UMTS has been modified to provide support and specification for the Evolved Universal Terrestrial Radio Access (E-UTRA) and Evolved Universal Terrestrial Radio Access Network (E-UTRAN).

At least some aspects of the systems and methods disclosed herein may be described in relation to the 3GPP LTE, LTE-Advanced (LTE-A) and other standards (e.g., 3GPP Releases 8, 9, 10, 11 and/or 12). However, the scope of the present disclosure should not be limited in this regard. At least some aspects of the systems and methods disclosed herein may be utilized in other types of wireless communication systems.

A wireless communication device may be an electronic device used to communicate voice and/or data to a base station, which in turn may communicate with a network of devices (e.g., public switched telephone network (PSTN), the Internet, etc.). In describing systems and methods herein, a wireless communication device may alternatively be referred to as a mobile station, a UE, an access terminal, a subscriber station, a mobile terminal, a remote station, a user terminal, a terminal, a subscriber unit, a mobile device, etc. Examples of wireless communication devices include cellular phones, smart phones, personal digital assistants (PDAs), laptop computers, netbooks, e-readers, wireless modems, etc. In 3GPP specifications, a wireless communication device is typically referred to as a UE. However, as the scope of the present disclosure should not be limited to the 3GPP standards, the terms "UE" and "wireless communication device" may be used interchangeably herein to mean the more general term "wireless communication device." A UE may also be more generally referred to as a terminal device.

In 3GPP specifications, a base station is typically referred to as a Node B, an evolved Node B (eNB), a home enhanced or evolved Node B (HeNB) or some other similar terminology. As the scope of the disclosure should not be limited to 3GPP standards, the terms "base station," "Node B," "eNB," and "HeNB" may be used interchangeably herein to mean the more general term "base station." Furthermore, the term "base station" may be used to denote an access point. An access point may be an electronic device that provides access to a network (e.g., Local Area Network (LAN), the Internet, etc.) for wireless communication devices. The term "communication device" may be used to denote both a wireless communication device and/or a base station. An eNB may also be more generally referred to as a base station device.

It should be noted that as used herein, a "cell" may be any communication channel that is specified by standardization or regulatory bodies to be used for International Mobile Telecommunications-Advanced (IMT-Advanced) and all of it or a subset of it may be adopted by 3GPP as licensed bands (e.g., frequency bands) to be used for communication between an eNB and a UE. It should also be noted that in E-UTRA and E-UTRAN overall description, as used herein, a "cell" may be defined as "combination of downlink and optionally uplink resources." The linking between the carrier frequency of the downlink resources and the carrier frequency of the uplink resources may be indicated in the system information transmitted on the downlink resources.

"Configured cells" are those cells of which the UE is aware and is allowed by an eNB to transmit or receive information. "Configured cell(s)" may be serving cell(s). The UE may receive system information and perform the required measurements on all configured cells. "Configured cell(s)" for a radio connection may consist of a primary cell and/or no, one, or more secondary cell(s). "Activated cells" are those configured cells on which the UE is transmitting and receiving. That is, activated cells are those cells for which the UE monitors the physical downlink control channel (PDCCH) and in the case of a downlink transmission, those cells for which the UE decodes a physical downlink shared channel (PDSCH). "Deactivated cells" are those configured cells that the UE is not monitoring the transmission PDCCH. It should be noted that a "cell" may be described in terms of differing dimensions. For example, a "cell" may have temporal, spatial (e.g., geographical) and frequency characteristics.

Fifth generation (5G) cellular communications (also referred to as "New Radio", "New Radio Access Technology" or "NR" by 3GPP) envisions the use of time/frequency/space resources to allow for enhanced mobile broadband (eMBB) communication and ultra-reliable low latency communication (URLLC) services, as well as massive machine type communication (mMTC) like services. In order for the services to use the time/frequency/space medium efficiently it would be useful to be able to flexibly schedule services on the medium so that the medium may be used as effectively as possible, given the conflicting needs of URLLC, eMBB, and mMTC. A new radio base station may be referred to as a gNB. A gNB may also be more generally referred to as a base station device.

In 5G NR, at least two different types of uplink control channel (PUCCH) formats may be specified: at least one short PUCCH format and one long PUCCH format. The PUCCH channel is designed to carry uplink control information (UCI). In NR, the long PUCCH format may span over multiple slots, and the PUCCH format of a UE may be configured by a base station.

In NR, several PUCCH formats will be specified. For UCI, different UCI may be reported on different PUCCH channel formats. In 5G NR, both CP-OFDM and DFT-S-OFDM waveforms are supported for UL transmission. Also, different numerologies may be used on one or more carriers or serving cells. Detailed mapping methods and signaling required for long PUCCH formats in NR. To minimize specification impact, a common framework should be used for both CP-OFDM and DFT-S-OFDM based long PUCCH design. Furthermore, design enhancements for some band-specific and application-specific scenarios are described. The systems and methods described herein detail formats for long PUCCH design. In particular, the RS patterns, the RS location and configurations for a long PUCCH are described herein.

Various examples of the systems and methods disclosed herein are now described with reference to the Figures, where like reference numbers may indicate functionally similar elements. The systems and methods as generally described and illustrated in the Figures herein could be arranged and designed in a wide variety of different implementations. Thus, the following more detailed description of several implementations, as represented in the Figures, is not intended to limit scope, as claimed, but is merely representative of the systems and methods.

FIG. 1 is a block diagram illustrating one implementation of one or more gNBs 160 and one or more UEs 102 in which systems and methods for long physical uplink control channel (PUCCH) design for 5th generation (5G) new radio (NR) may be implemented. The one or more UEs 102 communicate with one or more gNBs 160 using one or more antennas 122a-n. For example, a UE 102 transmits electromagnetic signals to the gNB 160 and receives electromagnetic signals from the gNB 160 using the one or more antennas 122a-n. The gNB 160 communicates with the UE 102 using one or more antennas 180a-n.

The UE 102 and the gNB 160 may use one or more channels 119, 121 to communicate with each other. For example, a UE 102 may transmit information or data to the gNB 160 using one or more uplink channels 121. Examples of uplink channels 121 include a PUCCH and a PUSCH, etc. The one or more gNBs 160 may also transmit information or data to the one or more UEs 102 using one or more downlink channels 119, for instance. Examples of downlink channels 119 include a PDCCH, a PDSCH, etc. Other kinds of channels may be used.

Each of the one or more UEs 102 may include one or more transceivers 118, one or more demodulators 114, one or more decoders 108, one or more encoders 150, one or more modulators 154, a data buffer 104 and a UE operations module 124. For example, one or more reception and/or transmission paths may be implemented in the UE 102. For convenience, only a single transceiver 118, decoder 108, demodulator 114, encoder 150 and modulator 154 are illustrated in the UE 102, though multiple parallel elements (e.g., transceivers 118, decoders 108, demodulators 114, encoders 150 and modulators 154) may be implemented.

The transceiver 118 may include one or more receivers 120 and one or more transmitters 158. The one or more receivers 120 may receive signals from the gNB 160 using one or more antennas 122a-n. For example, the receiver 120 may receive and downconvert signals to produce one or more received signals 116. The one or more received signals 116 may be provided to a demodulator 114. The one or more transmitters 158 may transmit signals to the gNB 160 using one or more antennas 122a-n. For example, the one or more transmitters 158 may upconvert and transmit one or more modulated signals 156.

The demodulator 114 may demodulate the one or more received signals 116 to produce one or more demodulated signals 112. The one or more demodulated signals 112 may be provided to the decoder 108. The UE 102 may use the decoder 108 to decode signals. The decoder 108 may produce decoded signals 110, which may include a UE-decoded signal 106 (also referred to as a first UE-decoded signal 106). For example, the first UE-decoded signal 106 may comprise received payload data, which may be stored in a data buffer 104. Another signal included in the decoded signals 110 (also referred to as a second UE-decoded signal 110) may comprise overhead data and/or control data. For example, the second UE-decoded signal 110 may provide data that may be used by the UE operations module 124 to perform one or more operations.

In general, the UE operations module 124 may enable the UE 102 to communicate with the one or more gNBs 160. The UE operations module 124 may include one or more of a UE long PUCCH module 126.

The UE long PUCCH module 126 may implement a long PUCCH design for 5th generation (5G) new radio (NR). Uplink control information and uplink waveform in NR are described. In LTE, the UCI carries hybrid-ARQ acknowledgements (HARQ-ACK), channel state information (CSI), and a scheduling request (SR). The CSI may include one or more of channel quality indicator (CQI), rank indication (RI), precoding matrix indicator (PMI), precoding type indicator (PTI), etc. Multiple dimensions of CSI may be reported from one or more cells to support FD-MIMO and CoMP operations.

Similarly, in NR, a scheduling request (SR), if defined, needs to be transmitted outside PUSCH, as well as HARQ-ACK for latency reasons. The CSI report in NR should be enhanced to support massive MIMO and beamforming methods. Thus, multiple sets of CSI may be reported in NR. Again, a CSI feedback may include one or more of CQI, RI, PMI, PTI, beam index, etc. At least two types of CSI reports may be supported, periodic CSI and aperiodic CSI. Periodic CSI report can be configured semi-statically. Aperiodic CSI can be trigger with a CSI request from the gNB 160. Therefore, physical uplink control signaling should be able to carry at least hybrid-ARQ acknowledgements, CSI reports (possibly including beamforming information), and scheduling requests.

The UCI information may be transmitted as L1/L2 control signaling (e.g., via a physical uplink control channel (PUCCH) or physical uplink share channel (PUSCH) or uplink data channel). Furthermore, it should be possible to dynamically indicate (at least in combination with Radio Resource Control (RRC)) the timing between data reception and hybrid-ARQ acknowledgement transmission as part of the Downlink Control Information (DCI).

In NR, different numerologies are supported on the same or different carriers. For the uplink transmission supports two waveform/modulation schemes based on Orthogonal Frequency Division Multiplexing (OFDM). One waveform/modulation scheme is cyclic prefix OFDM (CP-OFDM). Another waveform/modulation scheme is discrete Fourier transform (DFT) spread OFDM (DFT-S-OFDM), also known as single carrier FDMA (SC-FDMA), or low Peak-to-Average Power Ratio (PAPR) waveform. Therefore, the uplink control and uplink data channel may be configured separately with the same or different waveforms and numerologies.

LTE and 5G NR physical uplink control channel (PUCCH) are also discussed herein. In LTE, the PUCCH with normal Transmission Time Interval (TTI) length occupies a full subframe and 1 resource block (RB) for format 1/2/3/5, and more than one RB is supported for Format 4. Different formats are used to carry different number of UCI payload sizes. Frequency hopping is supported for all 1 ms TTI PUCCH formats by transmitting two slots in two ends of the carrier frequency. The UE multiplexing capability is performed in the frequency domain and/or time domain depending on the PUCCH format.

Format 1/1a/1b has 3 RS symbols in each slot. Zadoff-Chu (Z-C) sequence is used on frequency domain, orthogonal sequences are used for PUCCH spreading in time domain, $N_{SF}^{PUCCH}=4$ for normal CP, $N_{PUCCH}^{SF}=3$ for extended CP.

Format 2/2a/2b has two RS symbols in each slot. It uses Z-C sequences on frequency domain for UE multiplexing, no time domain multiplexing.

Format 3 has two RS symbols in each slot, it only uses time domain multiplexing with orthogonal sequences ($N_{SF}^{PUCCH}=5$ for normal CP and $N_{SF}^{PUCCH}=4$ for extended CP) and no frequency domain multiplexing.

Format 4 may occupy one or more RBs. It carries coded information bits on all data carrying symbols. Thus, it provides largest payload size, but does not support multiplexing for multiple UEs 102 in the same RB.

Format 5 uses only one RB, It has the same structure as Format 4 except that a spreading factor of 2 $N_{SF}^{PUCCH}=2$ is supported, thus two UEs 102 can be multiplexed on the same RB resources.

Similar to different PUCCH formats in LTE, at least two transmission durations are supported for uplink control in NR. One short transmission duration around the last OFDM symbol in a slot may be supported for uplink control in NR. This short transmission duration may be time division multiplexed (TDM) or frequency division multiplexed (FDM) with data. One long transmission duration spanning multiple symbols (e.g. filling most of a slot or slots) may be frequency division multiplexed (FDM) with data.

A short PUCCH format may consist of one or two symbols. A long PUCCH format may span multiple symbols and slots. Multiple long PUCCH formats may be defined (e.g., 4 symbols, a slot, and multiple slots, etc.). A long PUCCH format may be useful for larger payload HARQ-ACK feedback, CSI feedback, etc.

At least a low PAPR/CM design should be supported for the long PUCCH format. A UCI carried by long duration UL control channel at least with low PAPR design can be transmitted in one slot or multiple slots, and transmission across multiple slots should allow a total duration of 1 ms at least for some cases.

For PUCCH format configuration, a combination of semi-static configuration and (at least for some types of UCI information) dynamic signaling is used to determine the PUCCH formats and resources both for the long and short PUCCH formats. The long PUCCH design for 5G NR is described more fully herein.

A long PUCCH should occupy at least a whole slot. Thus, in one case, a long PUCCH should not be configured in partial UL slots (e.g., in a self-contained slot or UL-centric slot). Otherwise, a different PUCCH structure may be defined for a UL-centric slot with a different number of symbols.

In another case, a long PUCCH can be designed for one or more slots, but some symbols may be punctured in a UL-centric slot. In this case, the design should take into account of potential puncturing of some symbols up to a given limit (e.g., 4 symbols). Thus, a long PUCCH may also be transmitted in a UL-centric slot if the total number of punctured symbols is less than the limit. The long PUCCH may support both DFT-S-OFDM and CP-OFDM-based formats.

Regarding a DFT-S-OFDM-based long PUCCH, long PUCCH formats should support at least for low PAPR waveform (i.e., DFT-S-OFDM). For DFT-S-OFDM based long PUCCH formats, the LTE PUCCH structure may be reused in NR, at least on the DMRS location and spreading sequence design. Thus, the following two DMRS patterns should be supported for NR long PUCCH with low PAPR or DFT-S-OFDM waveform.

Figure 13:
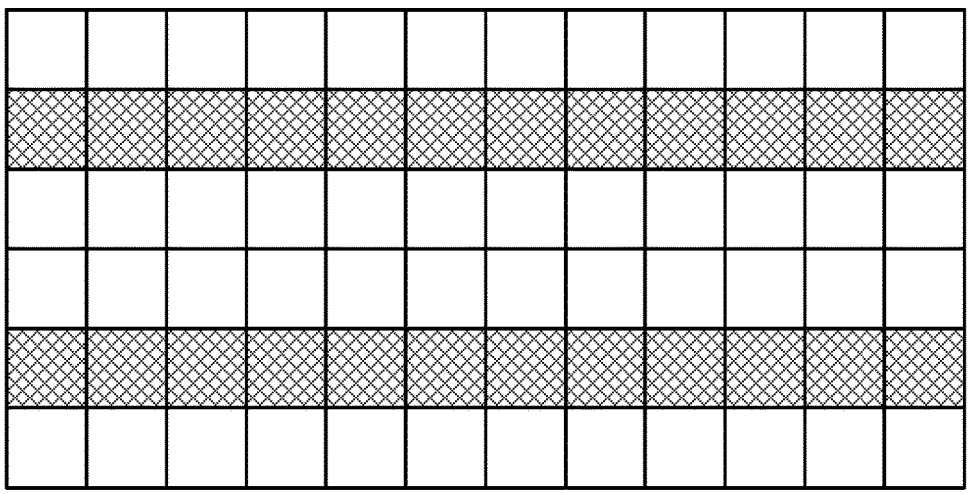
FIG. 13 illustrates examples of two demodulation reference signals (DMRS) in every 7 symbols for normal cyclic prefix (NCP) or 6 symbols for extended cyclic prefix (ECP)
Figure 13:
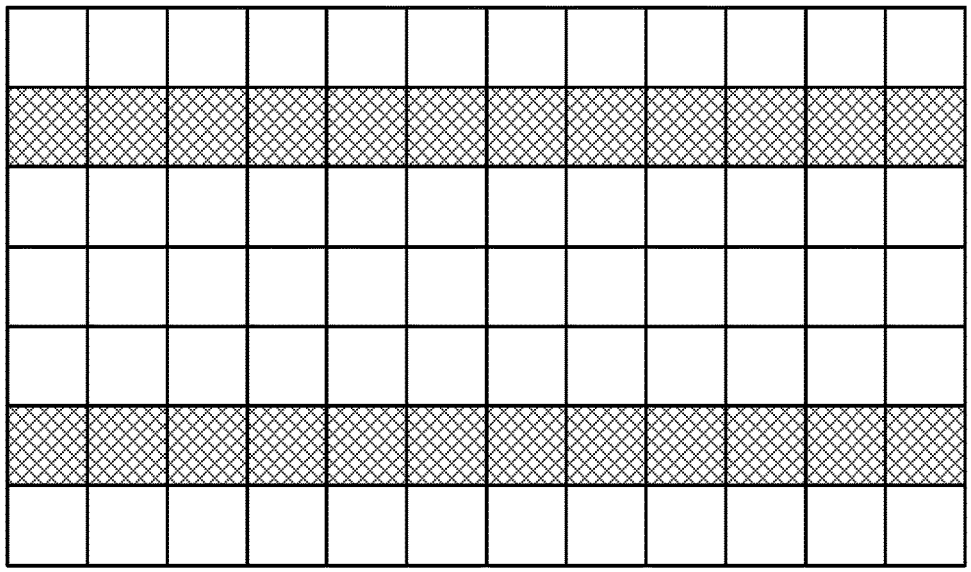

A first DMRS pattern (Pattern 1) includes 2 RS in every 7 or 6 symbols, as shown in FIG. 13. With this pattern, a long PUCCH format has 2 DMRS in every 7 symbols for normal CP (NCP), and 2 DMRS in every 6 symbols for extended CP (ECP) within a slot, as shown in FIG. 13 with the DMRS positions.

The DMRS signal generation and spreading sequences for UCI data can be the same as in LTE PUCCH format 2 and PUCCH Format 3. Therefore, at least two formats can be supported for NR long PUCCH format depending on the UCI data spreading methods. In one format, within each RB, different UCI symbols are transmitted on different OFDM symbols, and spreading factor is applied at frequency domain with the Z-C sequence. This is similar to LTE PUCCH Format 2.

In another format, within each RB, different UCI symbols are transmitted on different subcarriers, and spreading factor is applied at time domain with the orthogonal sequences given in Table 1 below, where $N_{SF}^{PUCCH}=5$ for normal CP and $N_{SF}^{PUCCH}=4$ for extended CP. This is similar to LTE PUCCH Format 3. Table 1 provides an orthogonal sequence $w_{n_{oc}}(i)$

TABLE 1

| Sequence index | Orthogonal sequence $[w_{n_{OC}}(0) \ldots w_{n_{OC}}(N_{SF}^{PUCCH}-1)]$ | |
|---|---|---|
| $n_{OC}$ | $N_{SF}^{PUCCH}=5$ | $N_{SF}^{PUCCH}=4$ |
| 0 | [1 1 1 1 1] | [+1 +1 +1 +1] |
| 1 | [1 $e^{j2\pi/5}$ $e^{j4\pi/5}$ $e^{j6\pi/5}$ $e^{j8\pi/5}$] | [+1 −1 +1 −1] |
| 2 | [1 $e^{j4\pi/5}$ $e^{j8\pi/5}$ $e^{j2\pi/5}$ $e^{j6\pi/5}$] | [+1 +1 −1 −1] |
| 3 | [1 $e^{j6\pi/5}$ $e^{j2\pi/5}$ $e^{j8\pi/5}$ $e^{j4\pi/5}$] | [+1 −1 −1 +1] |
| 4 | [1 $e^{j8\pi/5}$ $e^{j6\pi/5}$ $e^{j4\pi/5}$ $e^{j2\pi/5}$] | — |

Figure 14:
FIG. 14 illustrates examples of one DMRS in every 7 symbols for NCP or 6 symbols for ECP.
Figure 14:
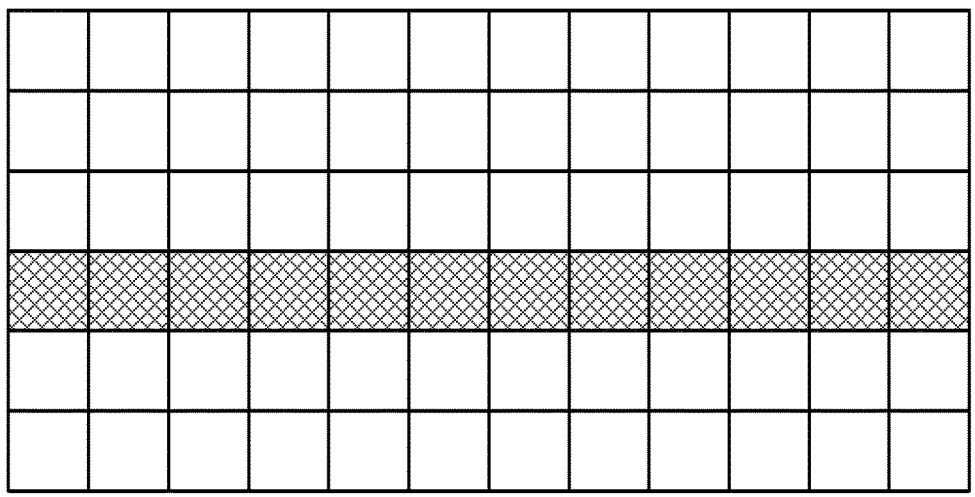
Figure 14:
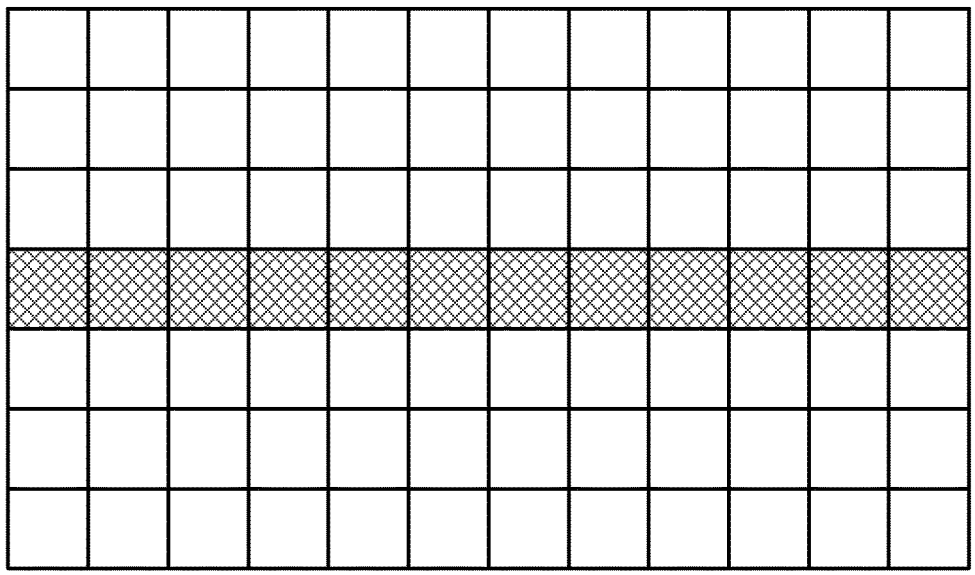

A second DMRS pattern (Pattern 2) includes one RS in every 7 or 6 symbols, as shown in FIG. 14. With this pattern, a long PUCCH format has 1 DMRS in every 7 symbols for normal CP (NCP), and 1 DMRS in every 6 symbols for extended CP (ECP) within a slot, as shown in FIG. 14 with the DMRS positions.

The DMRS signal generation and spreading sequences for UCI data can be similar to LTE PUCCH format 4 if no UE multiplexing in the same RB is supported. If up to 2 UE multiplexing is supported in the same RB, an orthogonal sequence in Table 2 with spreading factor of 2 can be used, which is similar to PUCCH format 5.

TABLE 2

| $n_{OC}$ | Orthogonal sequence $[w_{n_{CDM}}(0) \ldots w_{n_{CDM}}(N_{SC}^{RB}-1)]$ |
|---|---|
| 0 | [+1 +1 +1 +1 +1 +1 +1 +1 +1 +1 +1 +1] |
| 1 | [+1 +1 +1 +1 +1 +1 −1 −1 −1 −1 −1 −1] |

CP-OFDM based long PUCCH is also described herein. To minimize the specification impact, a common framework can be used for both DFT-S-OFDM and CP-OFDM-based long PUCCH. Thus, at least the same UCI multiplexing methods as in DFT-S-OFDM-based long PUCCH can be applied for CP-OFDM-based long PUCCH. Furthermore, the RS symbol location can also be maintained the same as in DFT-S-OFDM-based PUCCH.

Figure 15:
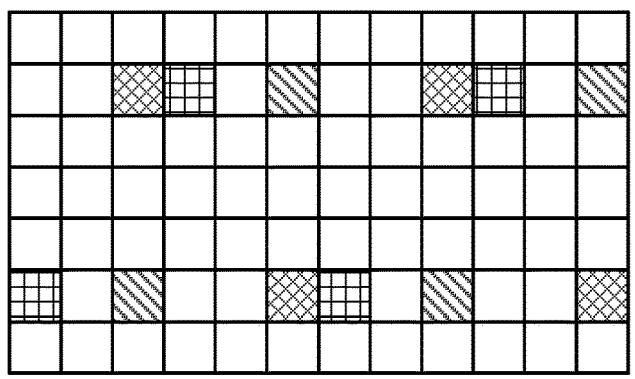
FIG. 15 illustrates examples of reference symbol (RS) patterns with frequency division multiplexing (FDM) among UEs for two DMRS in every 7 symbols for NCP.
Figure 15:
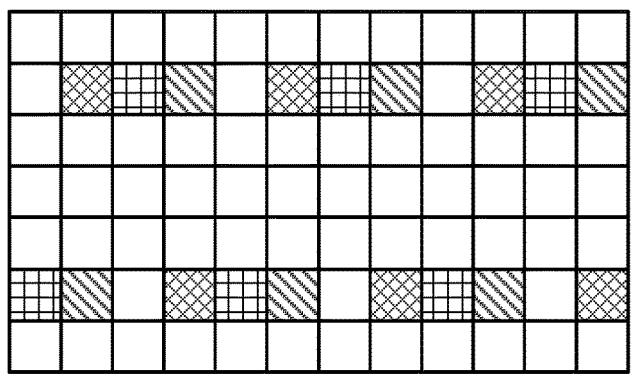
Figure 15:
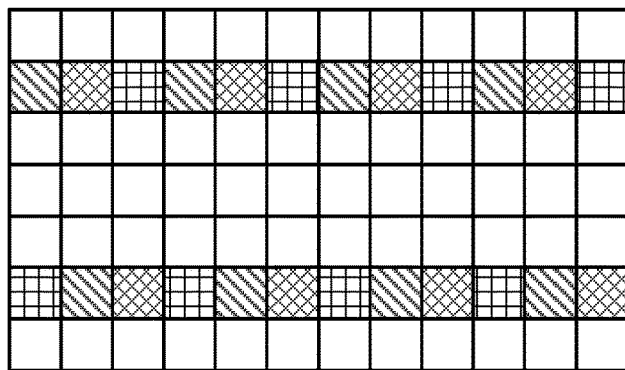
Figure 15:
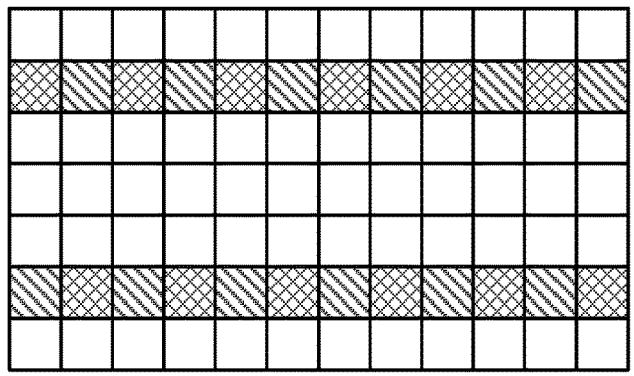
Figure 16:
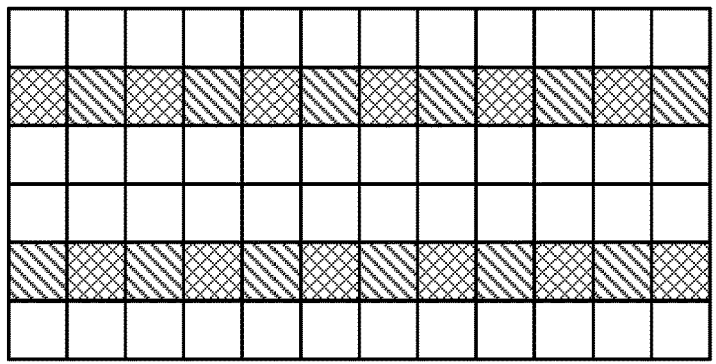
FIG. 16 illustrates examples of RS patterns with FDM among UEs for two DMRS in every 6 symbols for ECP.
Figure 16:
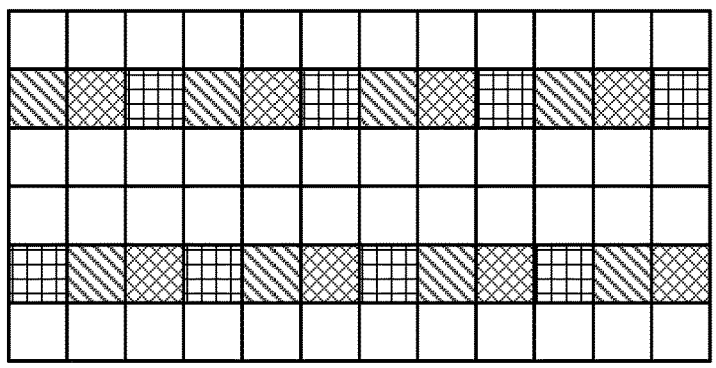
Figure 16:
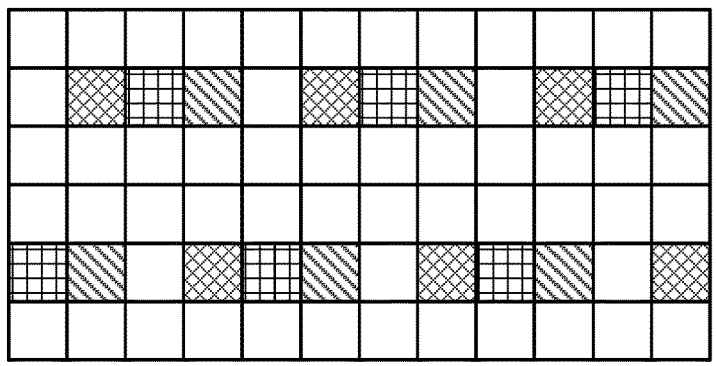
Figure 16:
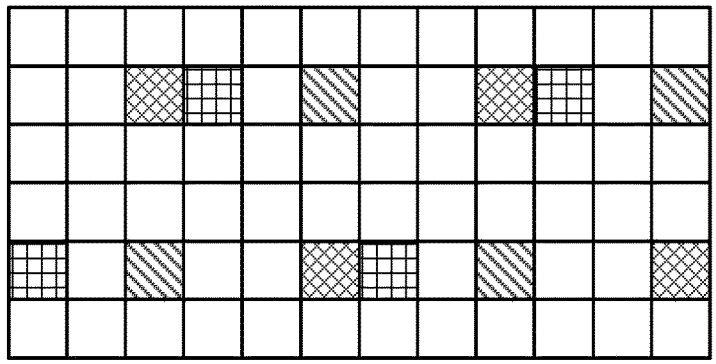

In DFT-S-OFDM based transmissions, the RS is separated by different Z-C sequences. In CP-OFDM based long PUCCH, the RS should be separated by FDM for different UEs 102. Thus, different UEs 102 are assigned with different RS patterns that are not overlapping with other UEs 102. FIG. 15 and FIG. 16 show several examples of RS multiplexing for different UEs 102 with pattern 1 where two RS symbols are used in every 7 symbols for NCP and every 6 symbols for ECP. Different UEs 102 are assigned with different subcarriers for RS transmission in the two DMRS symbols. In the Figures, each crosshatch represents the DMRS of a different UE 102.

There is a tradeoff between the UE multiplexing capability and the number of RS symbols in each RB. In one implementation, a UE 102 may be configured with 2 subcarriers for RS transmission within each DMRS symbol. Thus, an RB can be multiplexed with 6 UEs 102.

In another implementation, a UE 102 may be configured with 3 subcarriers for RS transmission within each DMRS symbol. Thus, an RB can be multiplexed with 4 UEs 102.

In another implementation, a UE 102 may be configured with 4 subcarriers for RS transmission within each DMRS symbol. Thus, an RB can be multiplexed with 3 UEs 102.

In yet another implementation, a UE may be configured with 6 subcarriers for RS transmission within each DMRS symbol. Thus, an RB can be multiplexed with 2 UEs 102.

Figure 17:
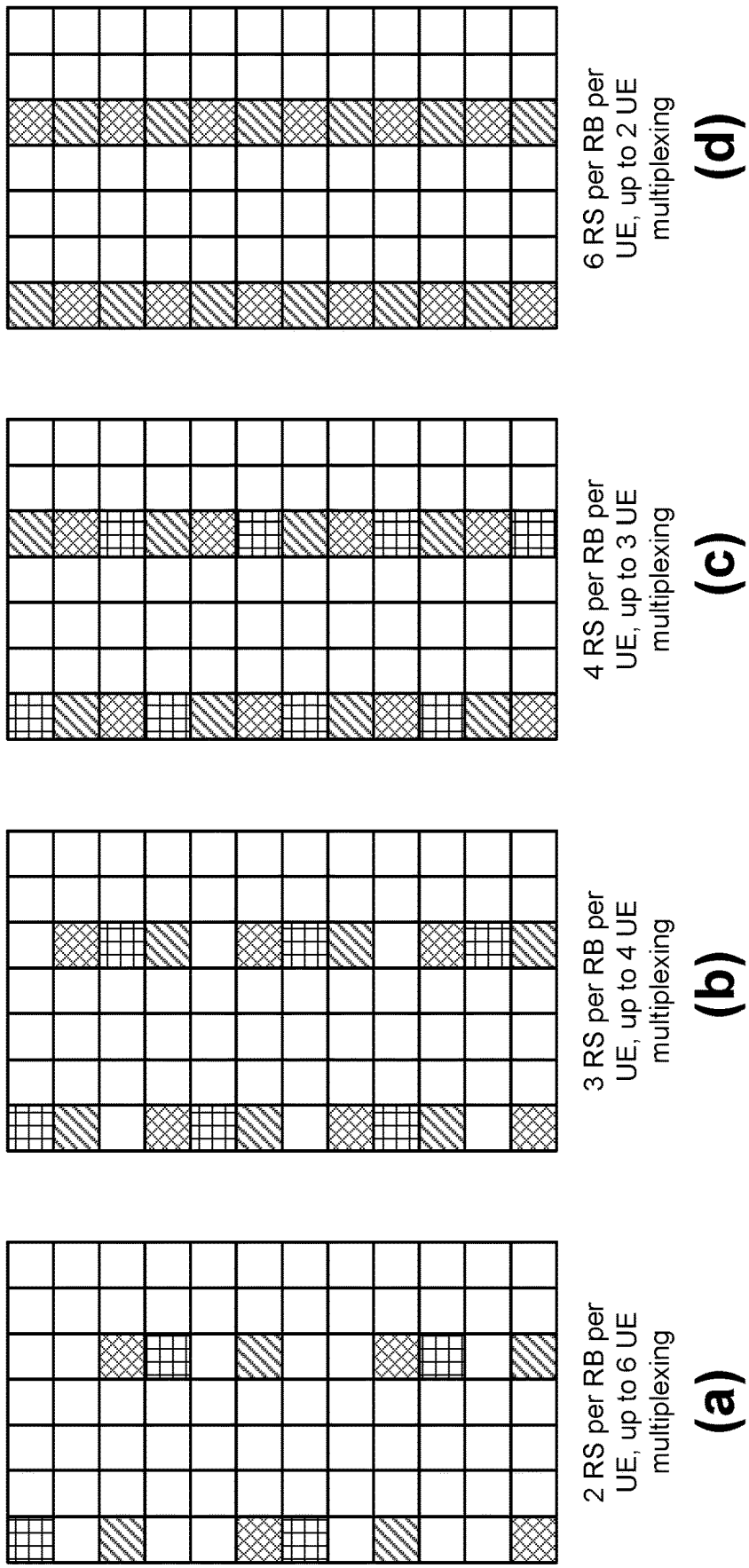
FIG. 17 illustrates examples of a shifted RS pattern with FDM among UEs for two DMRS in every 7 symbols for NCP.

For CP-OFDM based transmission with 2 RS symbols in each 7 symbols for NCP and every 6 symbols for ECP, the RS can also be located at the beginning. Thus, a shifted RS pattern can be applied. FIG. 17 shows an example with NCP.

Figure 18:
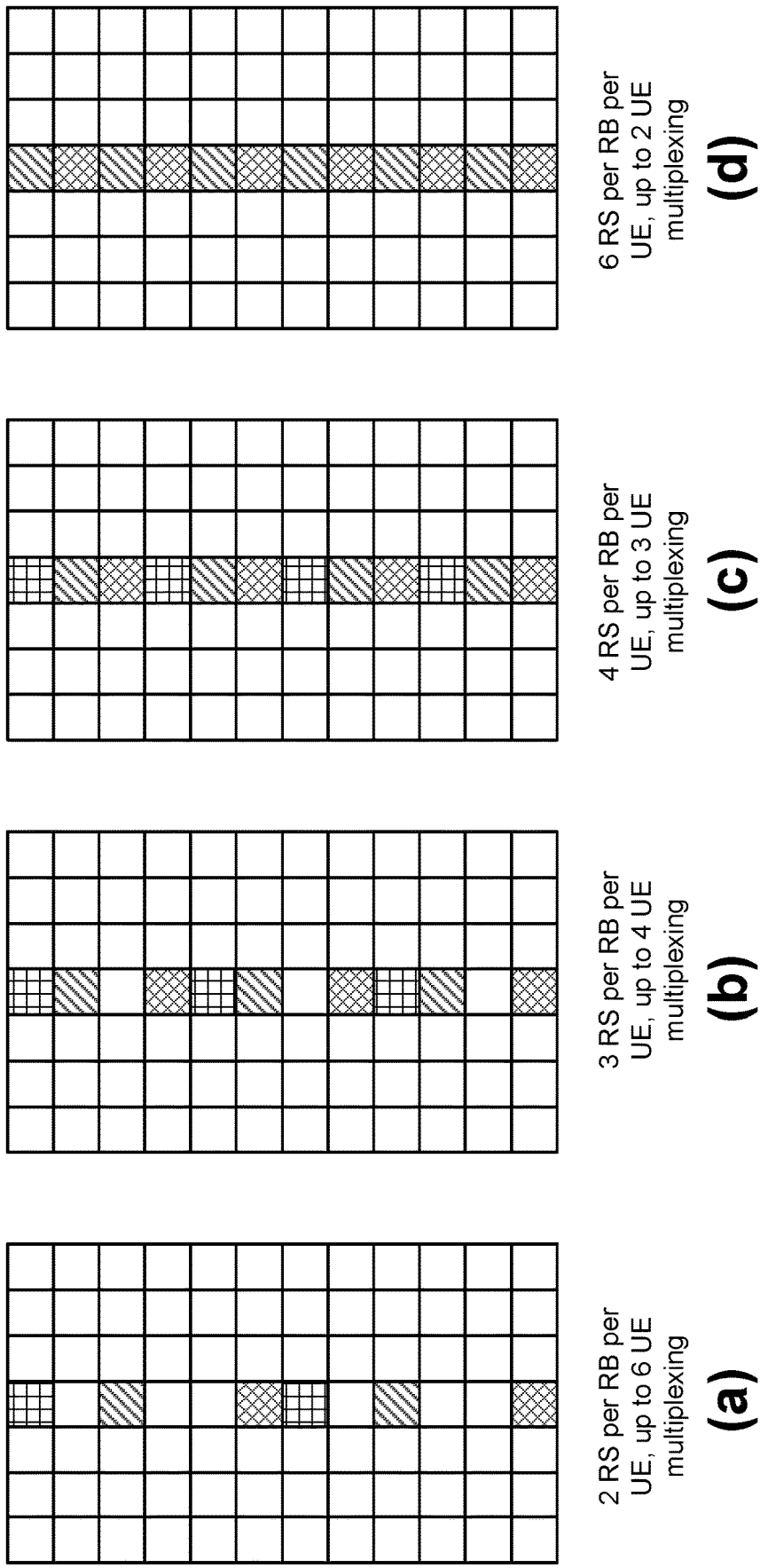
FIG. 18 illustrates examples of long PUCCH with one DMRS every 7 symbols for NCP.

Similarly, the same frequency division multiplexing (FDM) combinations can be used on the pattern with a single RS symbol in every 7 symbols for NCP and every 6 symbols for ECP. In this case, the RS position should be the same as in DFT-S-OFDM based transmission, and no shift of RS position is needed. FIG. 18 shows several examples for a long PUCCH with a single DMRS in every 7 symbols for NCP with different UE multiplexing capabilities.

In one implementation, a UE 102 may be configured with 2 subcarriers for RS transmission. Thus, an RB can be multiplexed with 6 UEs 102.

In another implementation, a UE 102 may be configured with 3 subcarriers for RS transmission. Thus, an RB can be multiplexed with 4 UEs 102.

In another implementation, a UE 102 may be configured with 4 subcarriers for RS transmission. Thus, an RB can be multiplexed with 3 UEs 102.

In yet another implementation, a UE 102 may be configured with 6 subcarriers for RS transmission. Thus, an RB can be multiplexed with 2 UEs 102.

To achieve UE multiplexing, the same or similar orthogonal sequence can be applied on the time domain or frequency domain as in the case with 2 DMRS every 7 symbols for NCP and every 6 symbols for ECP.

Figure 19:
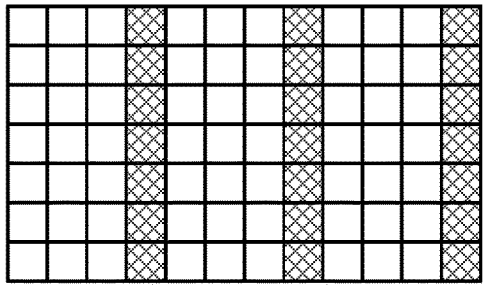
FIG. 19 illustrates examples of DMRS allocation at frequency domain.
Figure 19:
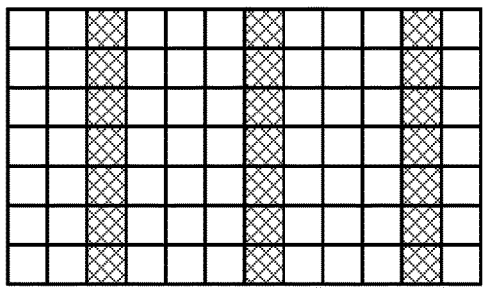
Figure 19:
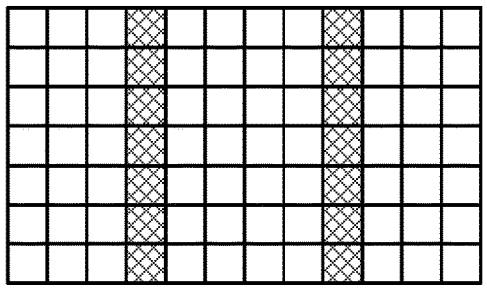
Figure 19:
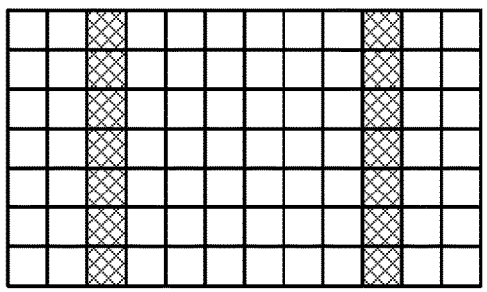
Figure 19:
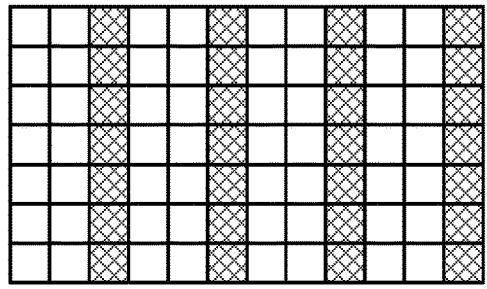

As described above, for CP-OFDM-based long PUCCH, the DMRS symbol locations can be used as in Discrete Fourier Transform-Spread-Orthogonal Frequency Division Multiplexing (DFT-S-OFDM)-based long PUCCH. On the other hand, CP-OFDM-based long PUCCH can be more flexible on DMRS pattern. For example, the DMRS locations can be spread in the frequency domain other than time domain. FIG. 19 shows several examples of DMRS spreads in the frequency domain on 2 subcarriers, 3 subcarriers and 4 subcarriers within each RB for NCP. For each number of RS in a RB, two potential DMRS locations are provided.

Figure 20:
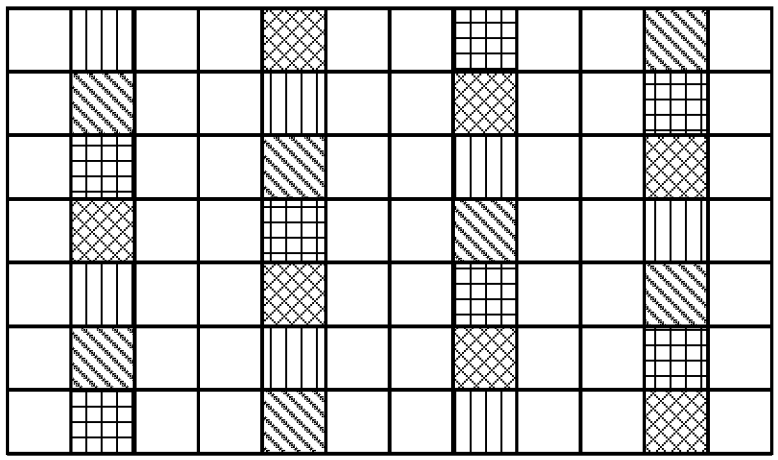
FIG. 20 illustrates examples of UE multiplexing with different DMRS patterns.
Figure 20:
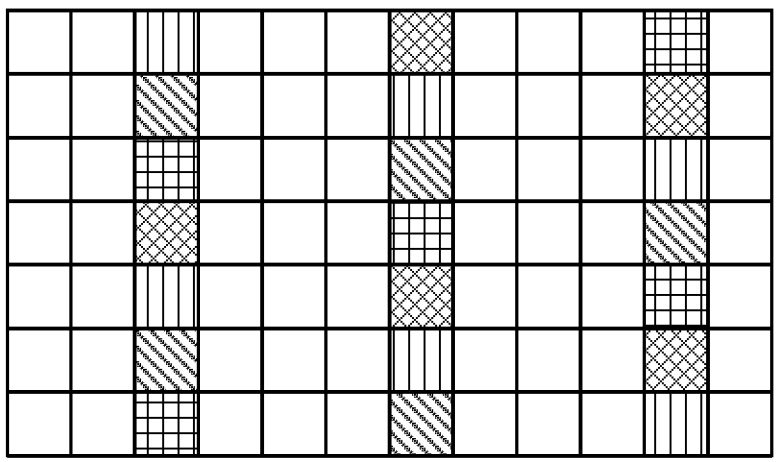
Figure 20:
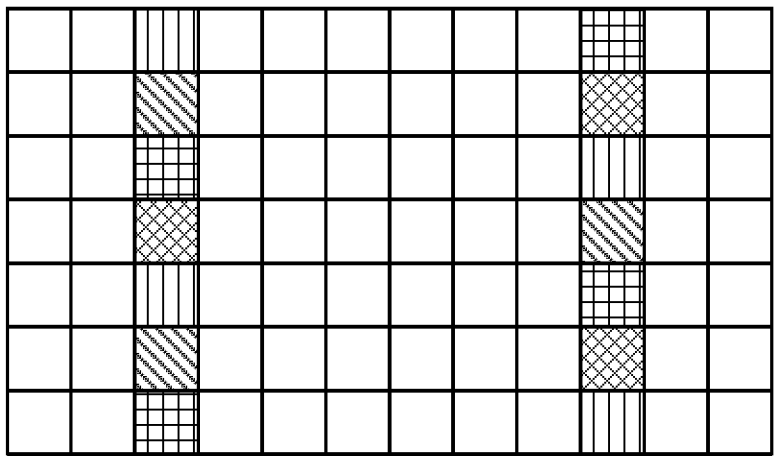

For DMRS UE multiplexing, different UEs 102 can be allocated with different symbols in the time domain with a DMRS pattern. FIG. 20 shows several examples where four UEs 102 are multiplexed with different DMRS patterns. In FIG. 20, each crosshatch represents the DMRS pattern of a given UE 102.

For UCI data, orthogonal sequences can be applied on either a time domain or a frequency domain for UE multiplexing. If an orthogonal sequence is spread in the time domain, the sequence length can be 7 for NCP, and 6 for ECP. If an orthogonal sequence is spread in the frequency domain, the sequence length can be the number of subcarriers per RB minus the number of subcarriers for DMRS.

Figure 21:
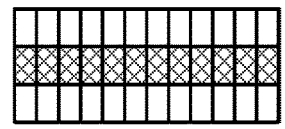
FIG. 21 illustrates examples of frequency hopping for long PUCCH formats.
Figure 21:
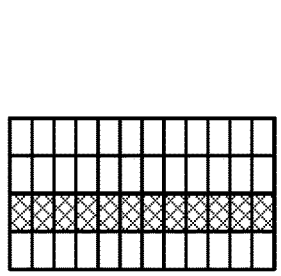
Figure 21:
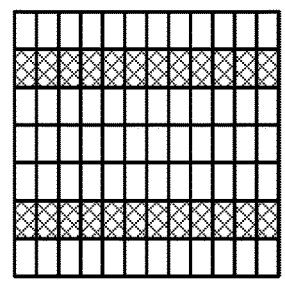
Figure 21:
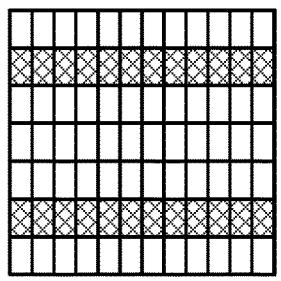
Figure 21:
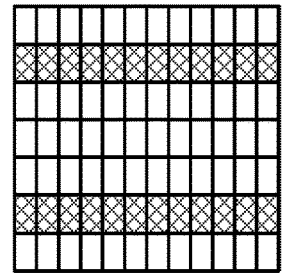
Figure 21:
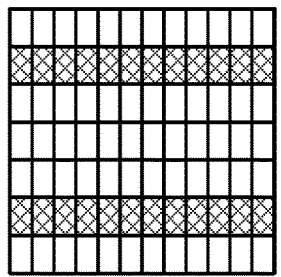

Configuration of a long PUCCH is also described herein. To provide frequency diversity, frequency hopping of a long PUCCH can be configured. In this case, separate PUCCH regions or subbands should be configured for a UE 102, and the PUCCH can be transmitted with frequency hopping in different regions/subbands, as shown in FIG. 21.

In one method, if a long PUCCH spans over multiple slots, frequency hopping can be applied at the slot level. Thus, adjacent slots are transmitted at different control regions/subbands.

In another method, if a long PUCCH spans over multiples of 7 symbols for NCP or multiples of 6 symbols for ECP, frequency hopping can be applied on every 7 symbols for NCP and every 6 symbols for ECP. Thus, different control regions/subbands are switched every 7 symbols for NCP and every 6 symbols for ECP. This method is slightly different from the above method. For example, a slot may have 7 or 14 symbols depending on the frequency band. Thus, this method has sub-slot frequency hopping if a slot has 14 symbols.

Yet in another method. if a long PUCCH occupies a single slot of 7 symbols for NCP or 6 symbols for ECP, frequency hopping can be applied at sub-slot symbol level, i.e. the first 4 symbols for NCP and first 3 symbols for ECP are transmitted in one control subband, and the remaining 3 symbols are transmitted in another control subband. In one approach, this sub-slot frequency hopping method can be used for all lengths of a long PUCCH.

In LTE, multiple PUCCH formats are defined for different maximum payload sizes. Similarly in NR, multiple long PUCCH formats should be configured for different maximum payload sizes and multiplexing capabilities. Thus, the tradeoff between RS, information bits and multiplexing capabilities should be considered.

Furthermore, for a given PUCCH format, the resource allocation can be more flexible than LTE depending on the channel conditions. For UEs 102 with very good signal conditions, fewer RB resources may be allocated for a PUCCH. For UEs 102 with bad signal conditions (e.g., cell edge UEs 102), more RB resources may be allocated for a PUCCH.

Therefore, for a long PUCCH, at least the following parameters may be configured for a given UE 102: the waveform (e.g., DFT-S-OFDM or CP-OFDM); a long PUCCH may occupy multiple RBs and the number of RBs of a long PUCCH may be configured (e.g., based on the payload size); a long PUCCH may occupy one or more slots and the length of a long PUCCH can be configurable based on the payload size and delay tolerance, etc.; a tradeoff can be considered between the number of RBs and the number of slot; the RS pattern and RS position; the spreading sequence for UCI multiplexing; and frequency diversity with multiple PUCCH regions/subbands. In order to reduce the signaling overhead, a list of supported long uplink control channel formats can be specified, each with a given set of parameters, and the name or index of a supported long PUCCH format may be indicated or configured to a UE 102.

Band specific considerations of a long PUCCH are also described herein. The 5G NR supports different frequency bands with different channel characteristics. Thus, the PUCCH behavior may be different for different frequency bands. For below 6 GHz frequency bands, the channel condition is more stable. Thus, it is better to use a semi-static configured PUCCH resource, or a dynamic indicated PUCCH resource.

For frequency band above 6 GHz, beamforming technology is critical for operation. Considering beam sweeping, a UE 102 may use different beams in different symbols, the DMRS from different symbols may not be appropriate for decoding of a different symbol. Thus, several methods can be considered for long PUCCH format at higher frequency bands above 6 GHz.

In a first method (Method 1), a long PUCCH can be configured with less number of symbols with the same beam in time domain and more RBs in frequency domain. For example, the long PUCCH can be limited to 7 symbols for NCP and 6 symbols for ECP, or limited to a single slot length.

In a second method (Method 2), a long PUCCH can be configured with a beam pattern (i.e., a pattern for the symbols with the same beam). The symbols of a long PUCCH may be spread over the beam pattern.

Figure 22:
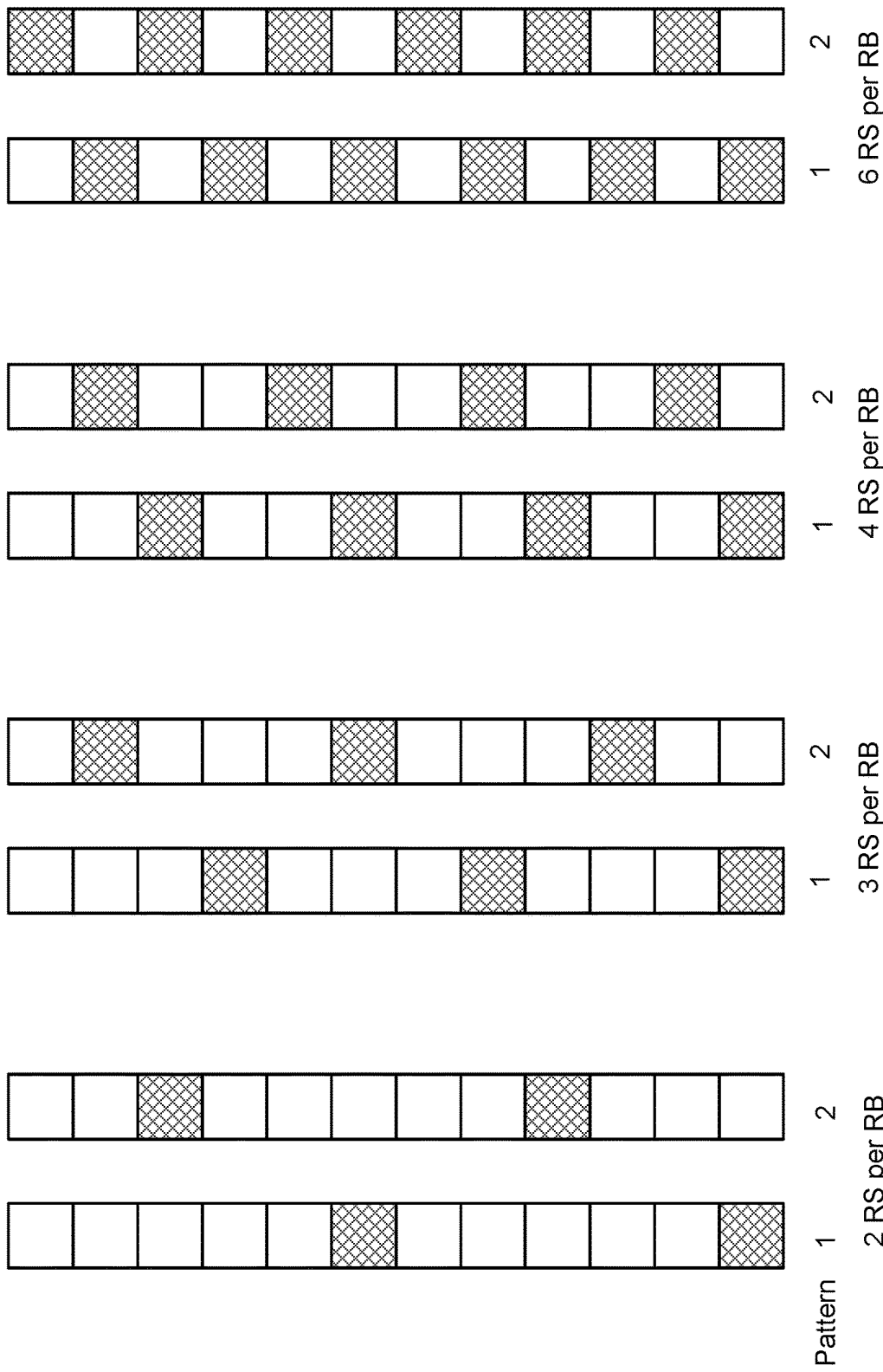
FIG. 22 illustrates examples of self-contained DMRS patterns in each symbol.

In a third method (Method 3), a long PUCCH can use self-contained DMRS in each symbol. The UE multiplexing within a RB can be reduced or eliminated. Furthermore, DMRS of 1 symbol short PUCCH can be used in each symbol. FIG. 22 shows the reference signal pattern designs. For each RS setting, at least two patterns can be defined, denoted as pattern 1 and pattern 2 without loss of generality. Staggered DMRS pattern or different DMRS patterns can be applied on different symbols. The UE 102 may use contiguous symbols or non-contiguous symbols defined by a symbol pattern. The symbol pattern may be configured by the gNB 160. The same beam can be applied on the symbols in the symbol pattern. Or different beams can be applied on the symbols in the symbol pattern if self-contained DMRS is used in each symbol.

For a long PUCCH above 6 GHz frequency band, in one method, the gNB 160 may indicate which symbols and/or beams should be used for long PUCCH transmission by semi-static higher layer singling or dynamic signaling via DCI. To determine the long PUCCH resource, 5G NR requires more configurations. At least one of the following aspects may be supported in NR. A long PUCCH format and/or resource for a UE 102 can be semi-statically configured by higher layer signaling. A long PUCCH format and/or resource for a UE 102 can be dynamically indicated by physical layer signaling (e.g., a DCI). Different long PUCCH formats may be configured or utilized for different types of UCI feedback and payload sizes.

PUCCH considerations for URLLC are also described herein. For ultra-reliable low latency communications (URLLC) traffic, several aspects need to be considered for PUCCH transmissions. URLLC traffic requires ultra-reliability and low latency, and may collide with a PUCCH or PUSCH transmission of the same UE 102. As a general rule, the URLLC traffic should have higher priority than any other UL transmissions.

In the case where a PUCCH transmission collides with a URLLC traffic in the same symbol, the URLLC should have higher priority. Several methods can be considered.

In a first method (Method 1), URLLC traffic is transmitted and the PUCCH in the overlapping symbol is dropped. This is a simple solution and can be applicable in all cases regardless of PUCCH waveforms and/or numerologies. The whole short PUCCH should be dropped for a 1-symbol PUCCH. For a 2-symbol PUCCH, if the URLLC collides with the first symbol of a short PUCCH, all short PUCCH symbols should be dropped. If a 2-symbol short PUCCH transmission already starts, and the URLLC collides with the 2nd symbol in a 2-symbol short PUCCH, the second symbol of the short PUCCH is dropped.

For a long PUCCH transmission, the over lapping symbols should be dropped to give higher priority to a URLLC transmission. A long PUCCH transmission may resume after the URLLC transmission. The UE 102 may drop the remaining long PUCCH transmission if the number of PUCCH symbols punctured by the URLLC is above a threshold because the PUCCH is not likely to be decoded correctly. The threshold value may be semi-statically configured for a given long PUCCH format.

In a second method (Method 2), simultaneous transmission of URLLC and PUCCH may be performed, with power scaling on PUCCH if necessary. If simultaneous transmission of URLLC and PUCCH is supported on the same symbol, UL transmit power should be allocated to the URLLC traffic first. The remaining power can be power scaled on the PUCCH REs in the same UL symbol. This can be applied if the PUCCH REs does not overlap with URLLC transmission REs.

In case of overlapping REs between URLLC and PUCCH, the URLLC signals are transmitted and PUCCH symbols on corresponding REs may be dropped. In another alternative, in case of overlapping REs between URLLC and PUCCH, the URLLC signals are transmitted and entire PUCCH symbol should be dropped as in method 1.

It should be noted that if URLLC traffic and PUCCH uses different waveforms, simultaneous transmission of URLLC and PUCCH may not be possible. Also, if URLLC traffic and PUCCH uses different numerologies, some guard interval may be required between different numerologies, and simultaneous transmission of URLLC and PUCCH may not be supported in some cases.

The UE operations module 124 may provide information 148 to the one or more receivers 120. For example, the UE operations module 124 may inform the receiver(s) 120 when to receive retransmissions.

The UE operations module 124 may provide information 138 to the demodulator 114. For example, the UE operations module 124 may inform the demodulator 114 of a modulation pattern anticipated for transmissions from the gNB 160.

The UE operations module 124 may provide information 136 to the decoder 108. For example, the UE operations module 124 may inform the decoder 108 of an anticipated encoding for transmissions from the gNB 160.

The UE operations module 124 may provide information 142 to the encoder 150. The information 142 may include data to be encoded and/or instructions for encoding. For example, the UE operations module 124 may instruct the encoder 150 to encode transmission data 146 and/or other information 142. The other information 142 may include PDSCH HARQ-ACK information.

The encoder 150 may encode transmission data 146 and/or other information 142 provided by the UE operations module 124. For example, encoding the data 146 and/or other information 142 may involve error detection and/or correction coding, mapping data to space, time and/or frequency resources for transmission, multiplexing, etc. The encoder 150 may provide encoded data 152 to the modulator 154.

The UE operations module 124 may provide information 144 to the modulator 154. For example, the UE operations module 124 may inform the modulator 154 of a modulation type (e.g., constellation mapping) to be used for transmissions to the gNB 160. The modulator 154 may modulate the encoded data 152 to provide one or more modulated signals 156 to the one or more transmitters 158.

The UE operations module 124 may provide information 140 to the one or more transmitters 158. This information 140 may include instructions for the one or more transmitters 158. For example, the UE operations module 124 may instruct the one or more transmitters 158 when to transmit a signal to the gNB 160. For instance, the one or more transmitters 158 may transmit during a UL subframe. The one or more transmitters 158 may upconvert and transmit the modulated signal(s) 156 to one or more gNBs 160.

Each of the one or more gNBs 160 may include one or more transceivers 176, one or more demodulators 172, one or more decoders 166, one or more encoders 109, one or more modulators 113, a data buffer 162 and a gNB operations module 182. For example, one or more reception and/or transmission paths may be implemented in a gNB 160. For convenience, only a single transceiver 176, decoder 166, demodulator 172, encoder 109 and modulator 113 are illustrated in the gNB 160, though multiple parallel elements (e.g., transceivers 176, decoders 166, demodulators 172, encoders 109 and modulators 113) may be implemented.

The transceiver 176 may include one or more receivers 178 and one or more transmitters 117. The one or more receivers 178 may receive signals from the UE 102 using one or more antennas 180a-n. For example, the receiver 178 may receive and downconvert signals to produce one or more received signals 174. The one or more received signals 174 may be provided to a demodulator 172. The one or more transmitters 117 may transmit signals to the UE 102 using one or more antennas 180a-n. For example, the one or more transmitters 117 may upconvert and transmit one or more modulated signals 115.

The demodulator 172 may demodulate the one or more received signals 174 to produce one or more demodulated signals 170. The one or more demodulated signals 170 may be provided to the decoder 166. The gNB 160 may use the decoder 166 to decode signals. The decoder 166 may produce one or more decoded signals 164, 168. For example, a first eNB-decoded signal 164 may comprise received payload data, which may be stored in a data buffer 162. A second eNB-decoded signal 168 may comprise overhead data and/or control data. For example, the second eNB-decoded signal 168 may provide data (e.g., PDSCH HARQ-ACK information) that may be used by the gNB operations module 182 to perform one or more operations.

In general, the gNB operations module 182 may enable the gNB 160 to communicate with the one or more UEs 102. The gNB operations module 182 may include one or more of a gNB long PUCCH module 194. The gNB long PUCCH module 194 may implement a long PUCCH design for 5G NR as described herein.

The gNB operations module 182 may provide information 188 to the demodulator 172. For example, the gNB operations module 182 may inform the demodulator 172 of a modulation pattern anticipated for transmissions from the UE(s) 102.

The gNB operations module 182 may provide information 186 to the decoder 166. For example, the gNB operations module 182 may inform the decoder 166 of an anticipated encoding for transmissions from the UE(s) 102.

The gNB operations module 182 may provide information 101 to the encoder 109. The information 101 may include data to be encoded and/or instructions for encoding. For example, the gNB operations module 182 may instruct the encoder 109 to encode information 101, including transmission data 105.

The encoder 109 may encode transmission data 105 and/or other information included in the information 101 provided by the gNB operations module 182. For example, encoding the data 105 and/or other information included in the information 101 may involve error detection and/or correction coding, mapping data to space, time and/or frequency resources for transmission, multiplexing, etc. The encoder 109 may provide encoded data 111 to the modulator 113. The transmission data 105 may include network data to be relayed to the UE 102.

The gNB operations module 182 may provide information 103 to the modulator 113. This information 103 may include instructions for the modulator 113. For example, the gNB operations module 182 may inform the modulator 113 of a modulation type (e.g., constellation mapping) to be used for transmissions to the UE(s) 102. The modulator 113 may modulate the encoded data 111 to provide one or more modulated signals 115 to the one or more transmitters 117.

The gNB operations module 182 may provide information 192 to the one or more transmitters 117. This information 192 may include instructions for the one or more transmitters 117. For example, the gNB operations module 182 may instruct the one or more transmitters 117 when to (or when not to) transmit a signal to the UE(s) 102. The one or more transmitters 117 may upconvert and transmit the modulated signal(s) 115 to one or more UEs 102.

It should be noted that a DL subframe may be transmitted from the gNB 160 to one or more UEs 102 and that a UL subframe may be transmitted from one or more UEs 102 to the gNB 160. Furthermore, both the gNB 160 and the one or more UEs 102 may transmit data in a standard special subframe.

It should also be noted that one or more of the elements or parts thereof included in the eNB(s) 160 and UE(s) 102 may be implemented in hardware. For example, one or more of these elements or parts thereof may be implemented as a chip, circuitry or hardware components, etc. It should also be noted that one or more of the functions or methods described herein may be implemented in and/or performed using hardware. For example, one or more of the methods described herein may be implemented in and/or realized using a chipset, an application-specific integrated circuit (ASIC), a large-scale integrated circuit (LSI) or integrated circuit, etc.

Figure 2:
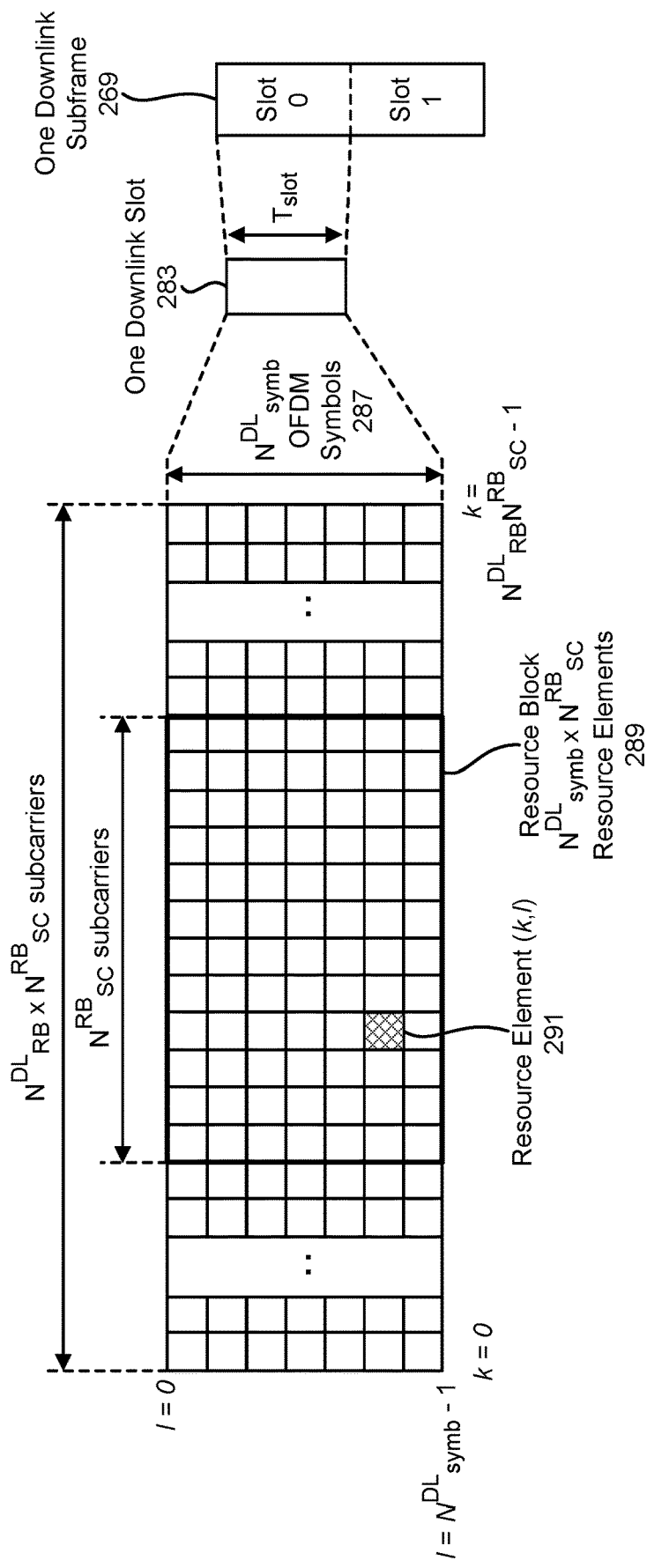
FIG. 2 is a diagram illustrating one example of a resource grid for the downlink.

FIG. 2 is a diagram illustrating one example of a resource grid for the downlink. The resource grid illustrated in FIG. 2 may be utilized in some implementations of the systems and methods disclosed herein. More detail regarding the resource grid is given in connection with FIG. 1.

In FIG. 2, one downlink subframe 269 may include two downlink slots 283. $N^{DL}_{RB}$ is downlink bandwidth configuration of the serving cell, expressed in multiples of $N^{RB}_{sc}$, where $N^{RB}_{sc}$ is a resource block 289 size in the frequency domain expressed as a number of subcarriers, and $N^{DL}_{symb}$ is the number of OFDM symbols 287 in a downlink slot 283. A resource block 289 may include a number of resource elements (RE) 291.

For a PCell, $N^{DL}_{RB}$ is broadcast as a part of system information. For an SCell (including an Licensed Assisted Access (LAA) SCell), $N^{DL}_{RB}$ is configured by a RRC message dedicated to a UE 102. For PDSCH mapping, the available RE 291 may be the RE 291 whose index l fulfills $l \geq l_{data,start}$ and/or $l_{data,end} \geq l$ in a subframe.

In the downlink, the OFDM access scheme with cyclic prefix (CP) may be employed, which may be also referred to as CP-OFDM. In the downlink, PDCCH, enhanced PDCCH (EPDCCH), PDSCH and the like may be transmitted. A downlink radio frame may consist of multiple pairs of downlink resource blocks (RBs) which is also referred to as physical resource blocks (PRBs). The downlink RB pair is a unit for assigning downlink radio resources, defined by a predetermined bandwidth (RB bandwidth) and a time slot. The downlink RB pair consists of two downlink RBs that are continuous in the time domain.

The downlink RB consists of twelve sub-carriers in frequency domain and seven (for normal CP) or six (for extended CP) OFDM symbols in time domain. A region defined by one sub-carrier in frequency domain and one OFDM symbol in time domain is referred to as a resource element (RE) and is uniquely identified by the index pair (k,l) in a slot, where k and l are indices in the frequency and time domains, respectively. While downlink subframes in one component carrier (CC) are discussed herein, downlink subframes are defined for each CC and downlink subframes are substantially in synchronization with each other among CCs.

Figure 3:
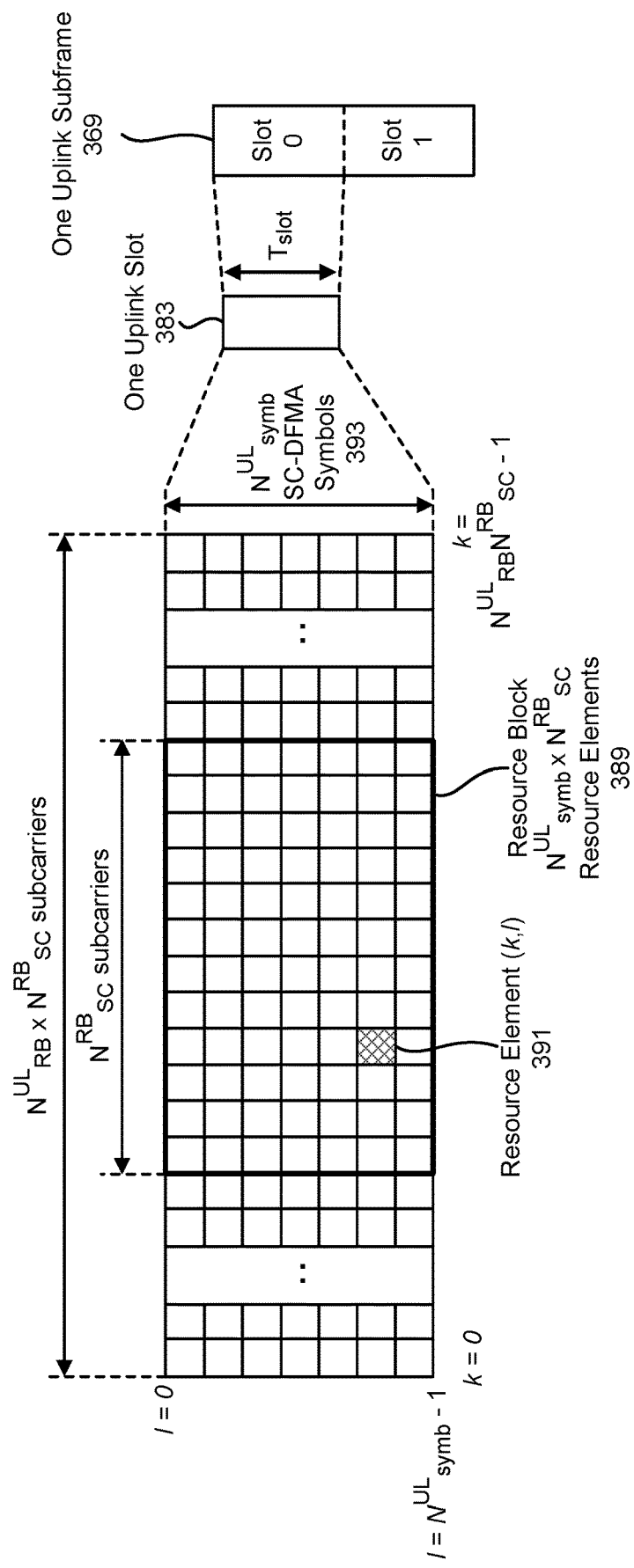
FIG. 3 is a diagram illustrating one example of a resource grid for the uplink.

FIG. 3 is a diagram illustrating one example of a resource grid for the uplink. The resource grid illustrated in FIG. 3 may be utilized in some implementations of the systems and methods disclosed herein. More detail regarding the resource grid is given in connection with FIG. 1.

In FIG. 3, one uplink subframe 369 may include two uplink slots 383. $N^{UL}_{RB}$ is uplink bandwidth configuration of the serving cell, expressed in multiples of $N^{RB}_{sc}$, where $N^{RB}_{sc}$ is a resource block 389 size in the frequency domain expressed as a number of subcarriers, and $N^{UL}_{symb}$ is the number of SC-FDMA symbols 393 in an uplink slot 383. A resource block 389 may include a number of resource elements (RE) 391.

For a PCell, $N^{UL}_{RB}$ is broadcast as a part of system information. For an SCell (including an LAA SCell), $N^{UL}_{RB}$ is configured by a RRC message dedicated to a UE 102.

In the uplink, in addition to CP-OFDM, a Single-Carrier Frequency Division Multiple Access (SC-FDMA) access scheme may be employed, which is also referred to as Discrete Fourier Transform-Spreading OFDM (DFT-S-OFDM). In the uplink, PUCCH, PDSCH, PRACH and the like may be transmitted. An uplink radio frame may consist of multiple pairs of uplink resource blocks. The uplink RB pair is a unit for assigning uplink radio resources, defined by a predetermined bandwidth (RB bandwidth) and a time slot. The uplink RB pair consists of two uplink RBs that are continuous in the time domain.

The uplink RB may consist of twelve sub-carriers in frequency domain and seven (for normal CP) or six (for extended CP) OFDM/DFT-S-OFDM symbols in time domain. A region defined by one sub-carrier in the frequency domain and one OFDM/DFT-S-OFDM symbol in the time domain is referred to as a RE and is uniquely identified by the index pair (k,l) in a slot, where k and l are indices in the frequency and time domains respectively. While uplink subframes in one component carrier (CC) are discussed herein, uplink subframes are defined for each CC.

Figure 4:
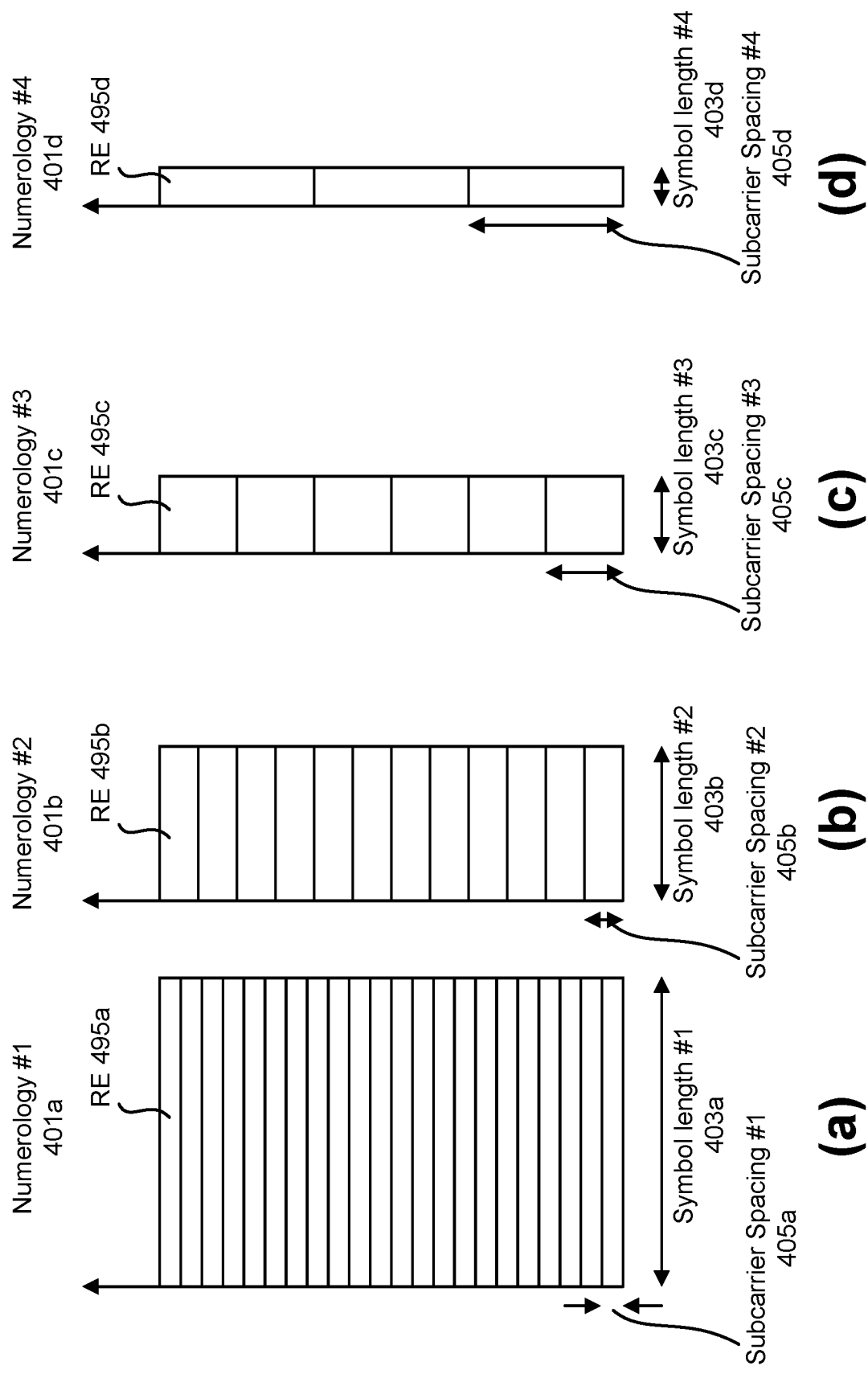
FIG. 4 shows examples of several numerologies.

FIG. 4 shows examples of several numerologies 401. The numerology #1 401a may be a basic numerology (e.g., a reference numerology). For example, a RE 495a of the basic numerology 401a may be defined with subcarrier spacing 405a of 15 kHz in frequency domain and 2048 Ts+CP length (e.g., 160 Ts or 144 Ts) in time domain (i.e., symbol length #1 403a), where Ts denotes a baseband sampling time unit defined as 1/(15000*2048) seconds. For the i-th numerology, the subcarrier spacing 405 may be equal to $15*2^i$ and the effective OFDM symbol length $2048*2^i*$Ts. It may cause the symbol length is $2048*2^{-i}*$Ts+CP length (e.g., $160*2^{-i}*$Ts or $144*2^{-i}*$Ts). In other words, the subcarrier spacing of the i+1-th numerology is a double of the one for the i-th numerology, and the symbol length of the i+1-th numerology is a half of the one for the i-th numerology. FIG. 4 shows four numerologies, but the system may support another number of numerologies. Furthermore, the system does not have to support all of the 0-th to the I-th numerologies, i=0, 1, . . . , I.

Figure 5:
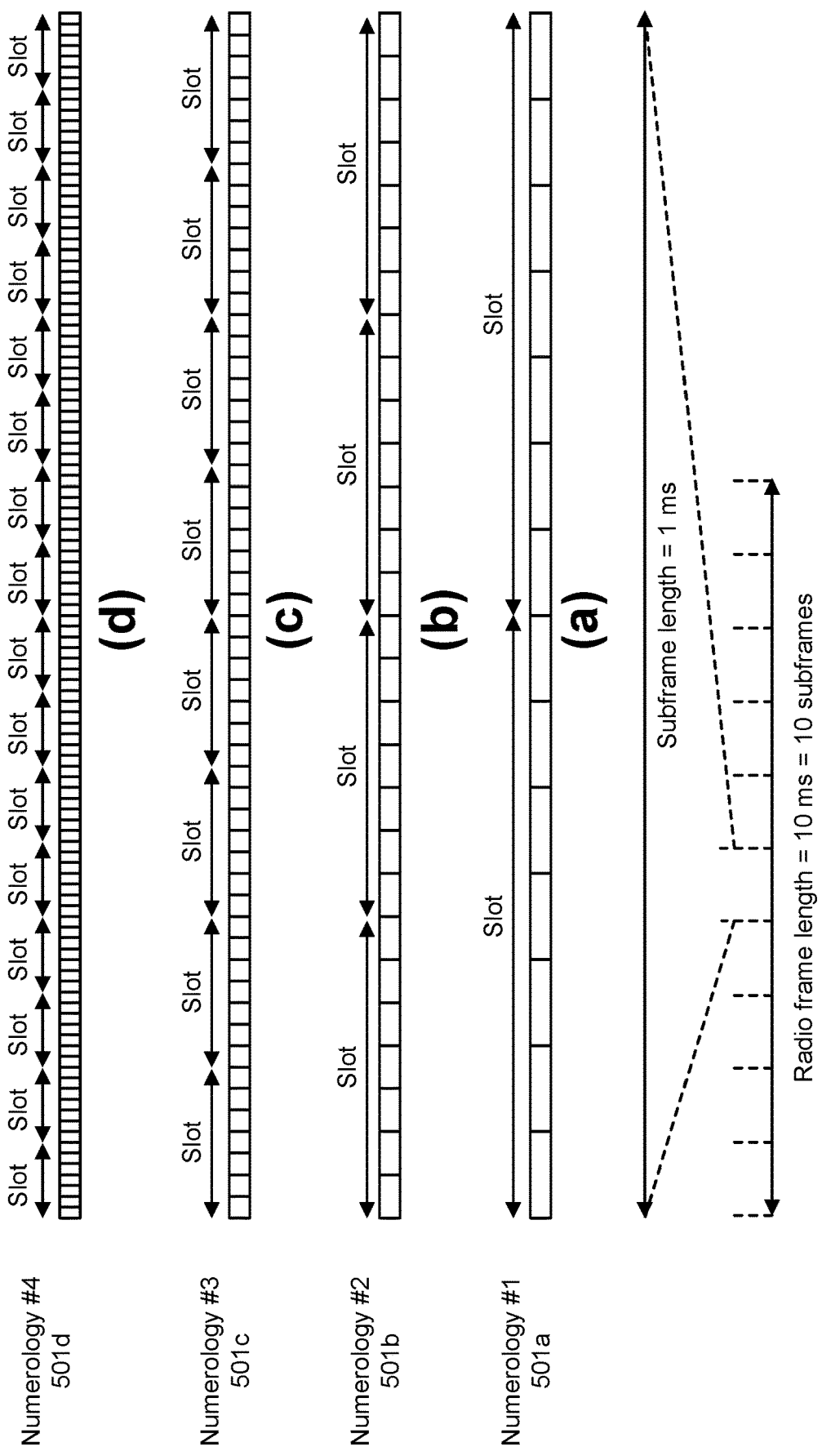
FIG. 5 shows examples of subframe structures for the numerologies that are shown in FIG. 4.

FIG. 5 shows examples of subframe structures for the numerologies 501 that are shown in FIG. 4. Given that a slot 283 includes $N^{DL}_{symb}$ (or $N^{UL}_{symb}$)=7 symbols, the slot length of the i+1-th numerology 501 is a half of the one for the i-th numerology 501, and eventually the number of slots 283 in a subframe (i.e., 1 ms) becomes double. It may be noted that a radio frame may include 10 subframes, and the radio frame length may be equal to 10 ms.

Figure 6:
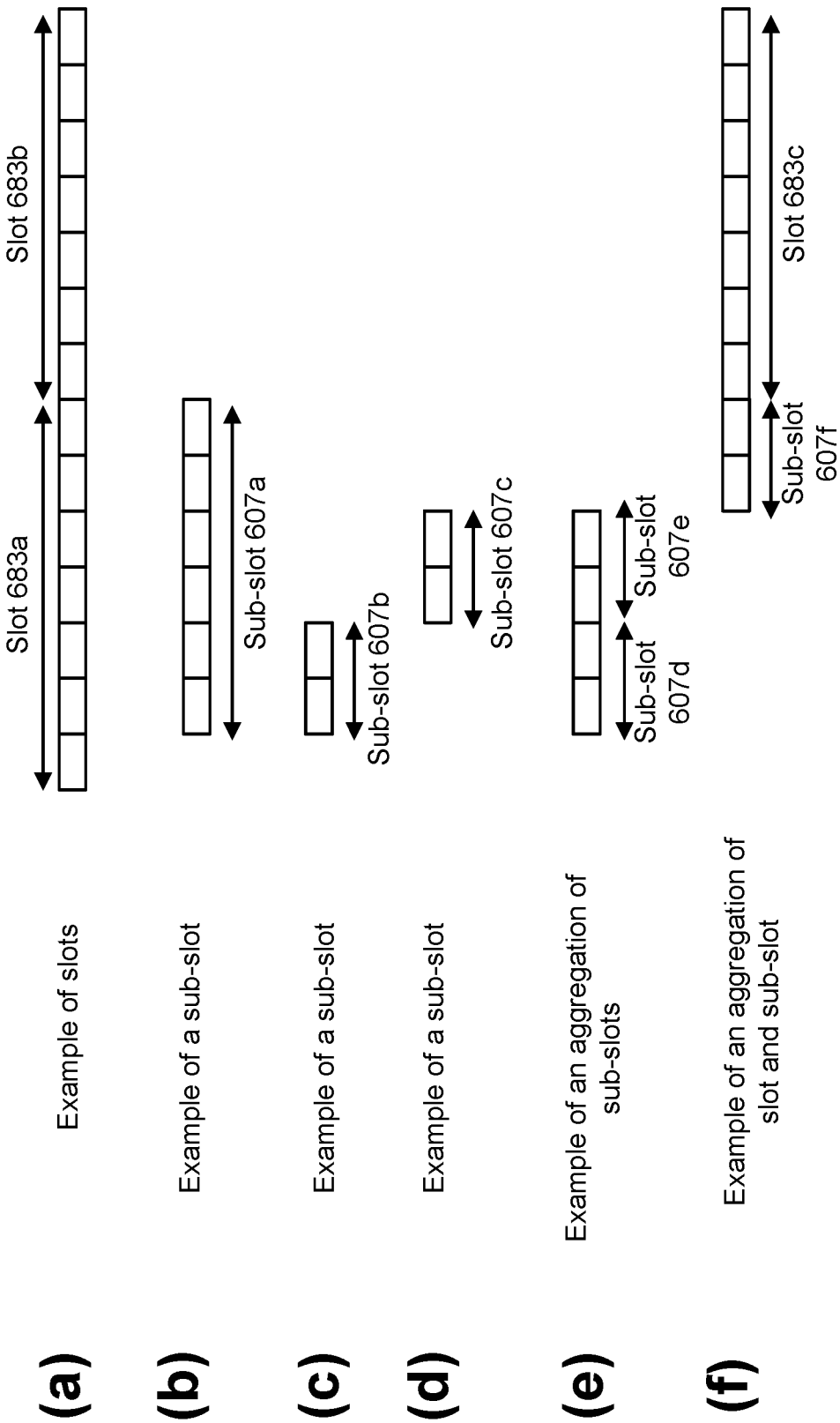
FIG. 6 shows examples of slots and sub-slots.

FIG. 6 shows examples of slots 683 and sub-slots 607. If a sub-slot 607 is not configured by higher layer, the UE 102 and the eNB/gNB 160 may only use a slot 683 as a scheduling unit. More specifically, a given transport block may be allocated to a slot 683. If the sub-slot 607 is configured by higher layer, the UE 102 and the eNB/gNB 160 may use the sub-slot 607 as well as the slot 683. The sub-slot 607 may include one or more OFDM symbols. The maximum number of OFDM symbols that constitute the sub-slot 607 may be $N^{DL}_{symb}-1$ (or $N^{UL}_{symb}-1$).

The sub-slot length may be configured by higher layer signaling. Alternatively, the sub-slot length may be indicated by a physical layer control channel (e.g., by DCI format).

The sub-slot 607 may start at any symbol within a slot 683 unless it collides with a control channel. There could be restrictions of mini-slot length based on restrictions on starting position. For example, the sub-slot 607 with the length of $N^{DL}_{symb}-1$ (or $N^{UL}_{symb}-1$) may start at the second symbol in a slot 683. The starting position of a sub-slot 607 may be indicated by a physical layer control channel (e.g., by DCI format). Alternatively, the starting position of a sub-slot 607 may be derived from information (e.g., search space index, blind decoding candidate index, frequency and/or time resource indices, PRB index, a control channel element index, control channel element aggregation level, an antenna port index, etc.) of the physical layer control channel which schedules the data in the concerned sub-slot 607.

In cases when the sub-slot 607 is configured, a given transport block may be allocated to either a slot 683, a sub-slot 607, aggregated sub-slots 607 or aggregated sub-slot(s) 607 and slot 683. This unit may also be a unit for HARQ-ACK bit generation.

Figure 7:
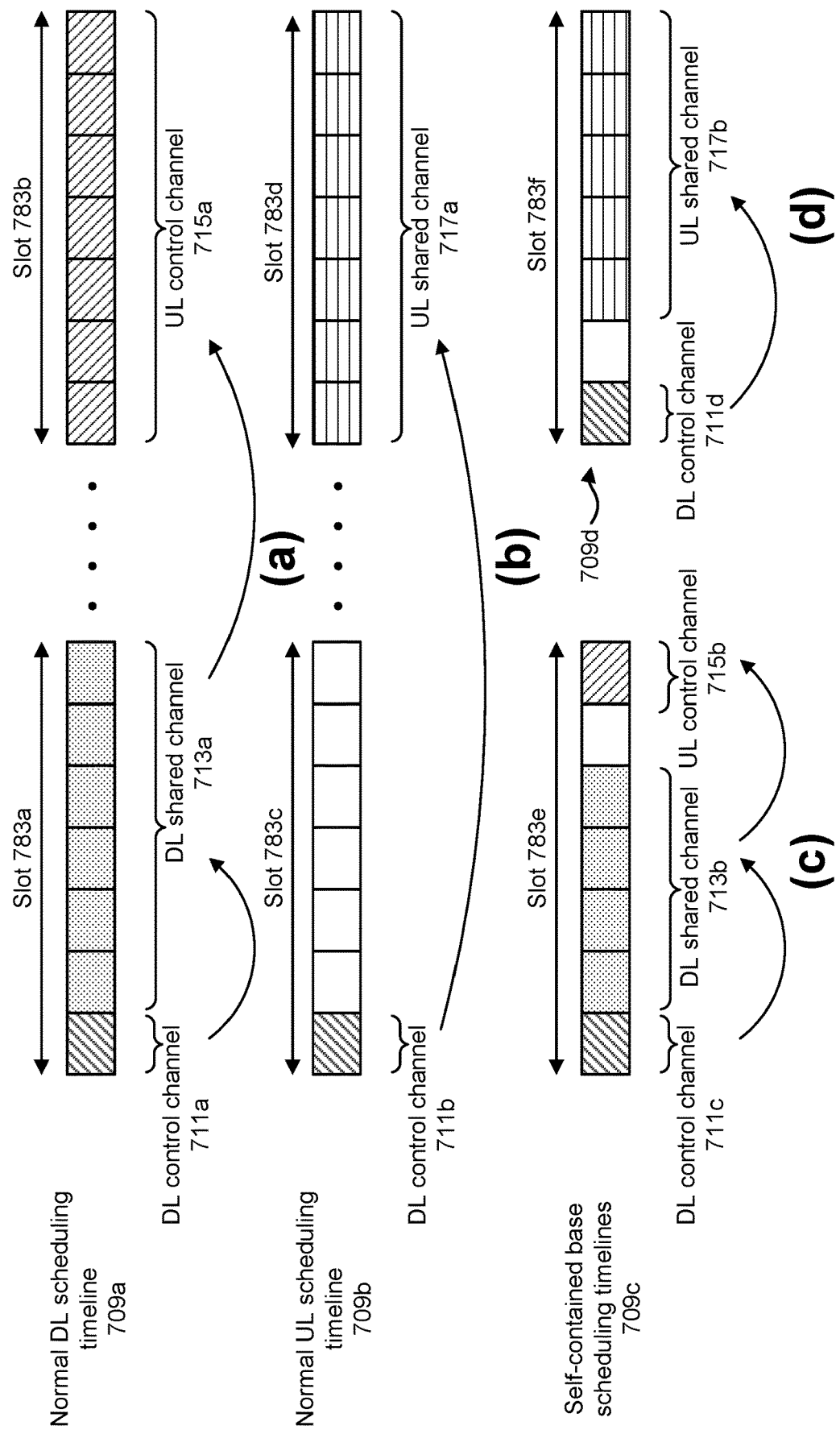
FIG. 7 shows examples of scheduling timelines.

FIG. 7 shows examples of scheduling timelines 709. For a normal DL scheduling timeline 709a, DL control channels are mapped the initial part of a slot 783a. The DL control channels 711 schedule DL shared channels 713a in the same slot 783a. HARQ-ACKs for the DL shared channels 713a (i.e., HARQ-ACKs each of which indicates whether or not transport block in each DL shared channel 713a is detected successfully) are reported via UL control channels 715a in a later slot 783b. In this instance, a given slot 783 may contain either one of DL transmission and UL transmission.

For a normal UL scheduling timeline 709b, DL control channels 711b are mapped the initial part of a slot 783c. The DL control channels 711b schedule UL shared channels 717a in a later slot 783d. For these cases, the association timing (time shift) between the DL slot 783c and the UL slot 783d may be fixed or configured by higher layer signaling. Alternatively, it may be indicated by a physical layer control channel (e.g., the DL assignment DCI format, the UL grant DCI format, or another DCI format such as UE-common signaling DCI format which may be monitored in common search space).

For a self-contained base DL scheduling timeline 709c, DL control channels 711c are mapped to the initial part of a slot 783e. The DL control channels 711c schedule DL shared channels 713b in the same slot 783e. HARQ-ACKs for the DL shared channels 713b are reported in UL control channels 715b, which are mapped at the ending part of the slot 783e.

For a self-contained base UL scheduling timeline 709d, DL control channels 711d are mapped to the initial part of a slot 783f. The DL control channels 711d schedule UL shared channels 717b in the same slot 783f. For these cases, the slot 783f may contain DL and UL portions, and there may be a guard period between the DL and UL transmissions.

The use of a self-contained slot may be upon a configuration of self-contained slot. Alternatively, the use of a self-contained slot may be upon a configuration of the sub-slot. Yet alternatively, the use of a self-contained slot may be upon a configuration of shortened physical channel (e.g., PDSCH, PUSCH, PUCCH, etc.).

Figure 8:
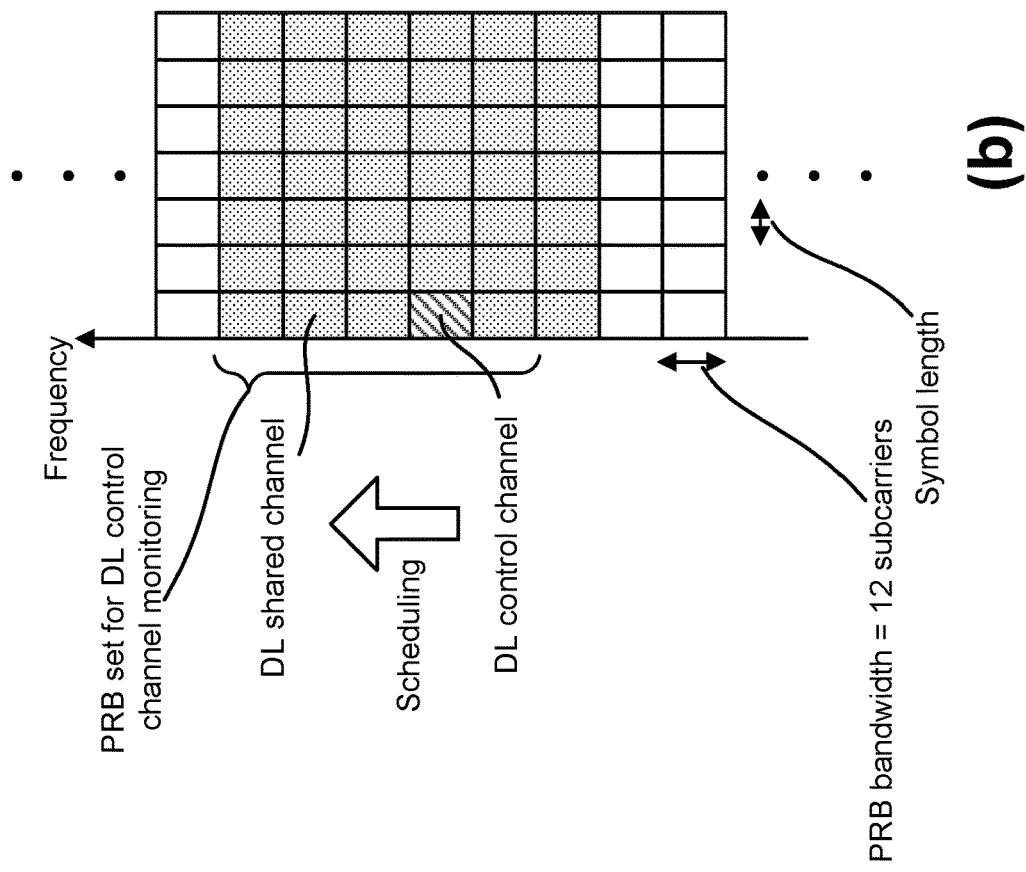
FIG. 8 shows examples of downlink (DL) control channel monitoring regions.
Figure 8:
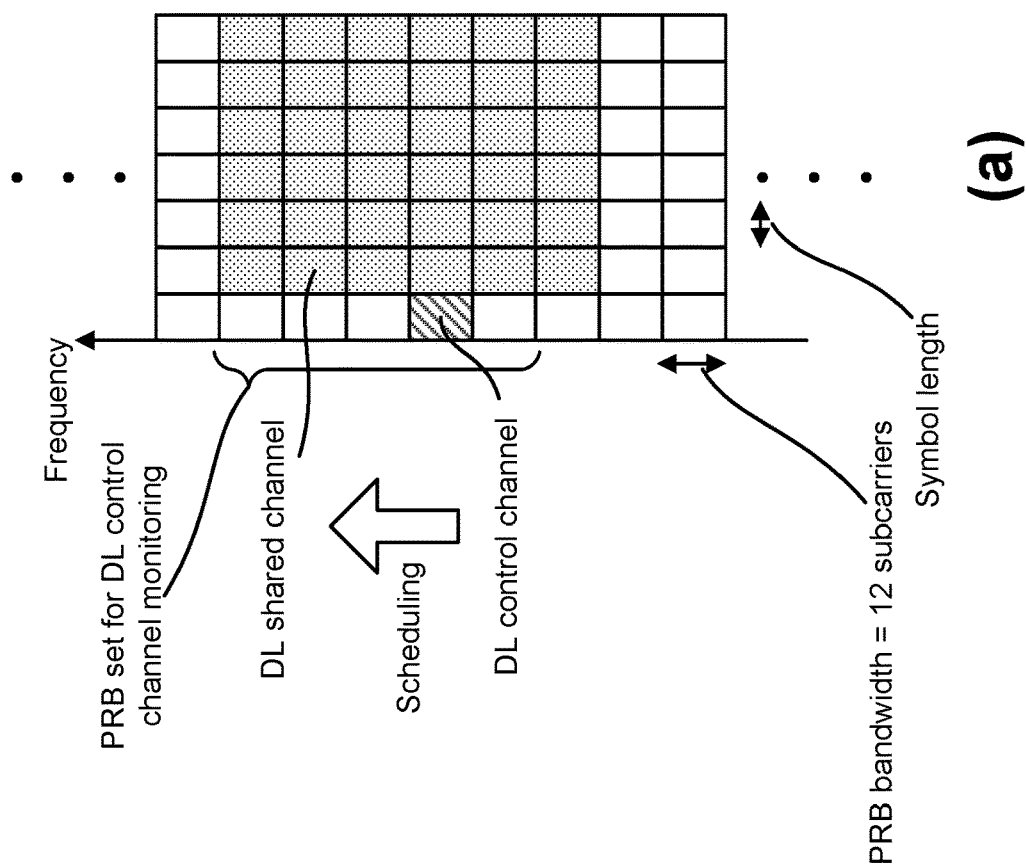

FIG. 8 shows examples of DL control channel monitoring regions. One or more sets of PRB(s) may be configured for DL control channel monitoring. In other words, a control resource set is, in the frequency domain, a set of PRBs within which the UE 102 attempts to blindly decode downlink control information, where the PRBs may or may not be frequency contiguous, a UE 102 may have one or more control resource sets, and one DCI message may be located within one control resource set. In the frequency-domain, a PRB is the resource unit size (which may or may not include DMRS) for a control channel. A DL shared channel may start at a later OFDM symbol than the one(s) which carries the detected DL control channel. Alternatively, the DL shared channel may start at (or earlier than) an OFDM symbol than the last OFDM symbol which carries the detected DL control channel. In other words, dynamic reuse of at least part of resources in the control resource sets for data for the same or a different UE 102, at least in the frequency domain may be supported.

Figure 9:
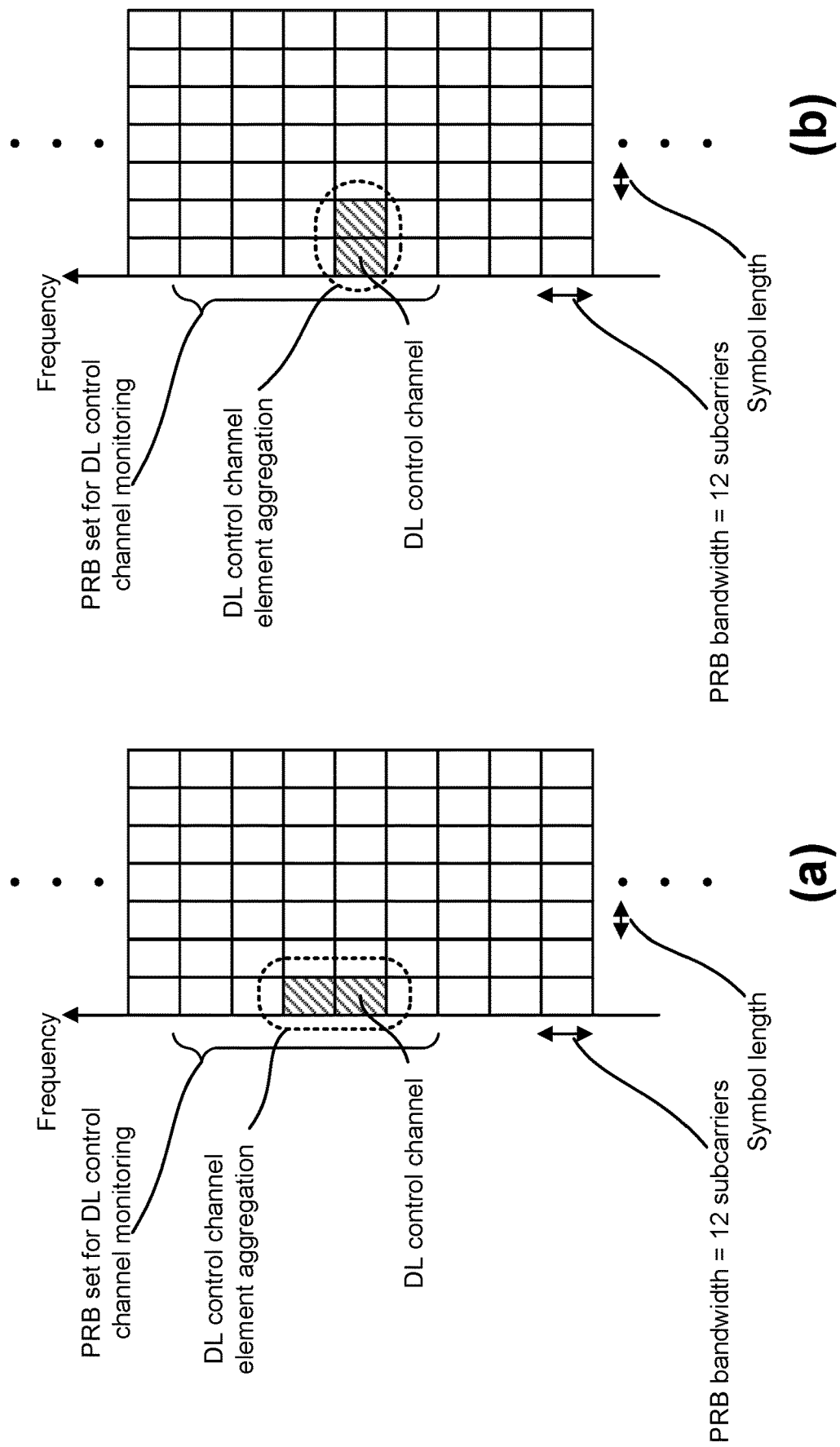
FIG. 9 shows examples of DL control channel which consists of more than one control channel elements.

FIG. 9 shows examples of DL control channel which consists of more than one control channel elements. When the control resource set spans multiple OFDM symbols, a control channel candidate may be mapped to multiple OFDM symbols or may be mapped to a single OFDM symbol. One DL control channel element may be mapped on REs defined by a single PRB and a single OFDM symbol. If more than one DL control channel elements are used for a single DL control channel transmission, DL control channel element aggregation may be performed.

The number of aggregated DL control channel elements is referred to as DL control channel element aggregation level. The DL control channel element aggregation level may be 1 or 2 to the power of an integer. The gNB 160 may inform a UE 102 of which control channel candidates are mapped to each subset of OFDM symbols in the control resource set. If one DL control channel is mapped to a single OFDM symbol and does not span multiple OFDM symbols, the DL control channel element aggregation is performed within an OFDM symbol, namely multiple DL control channel elements within an OFDM symbol are aggregated. Otherwise, DL control channel elements in different OFDM symbols can be aggregated.

Figure 10:
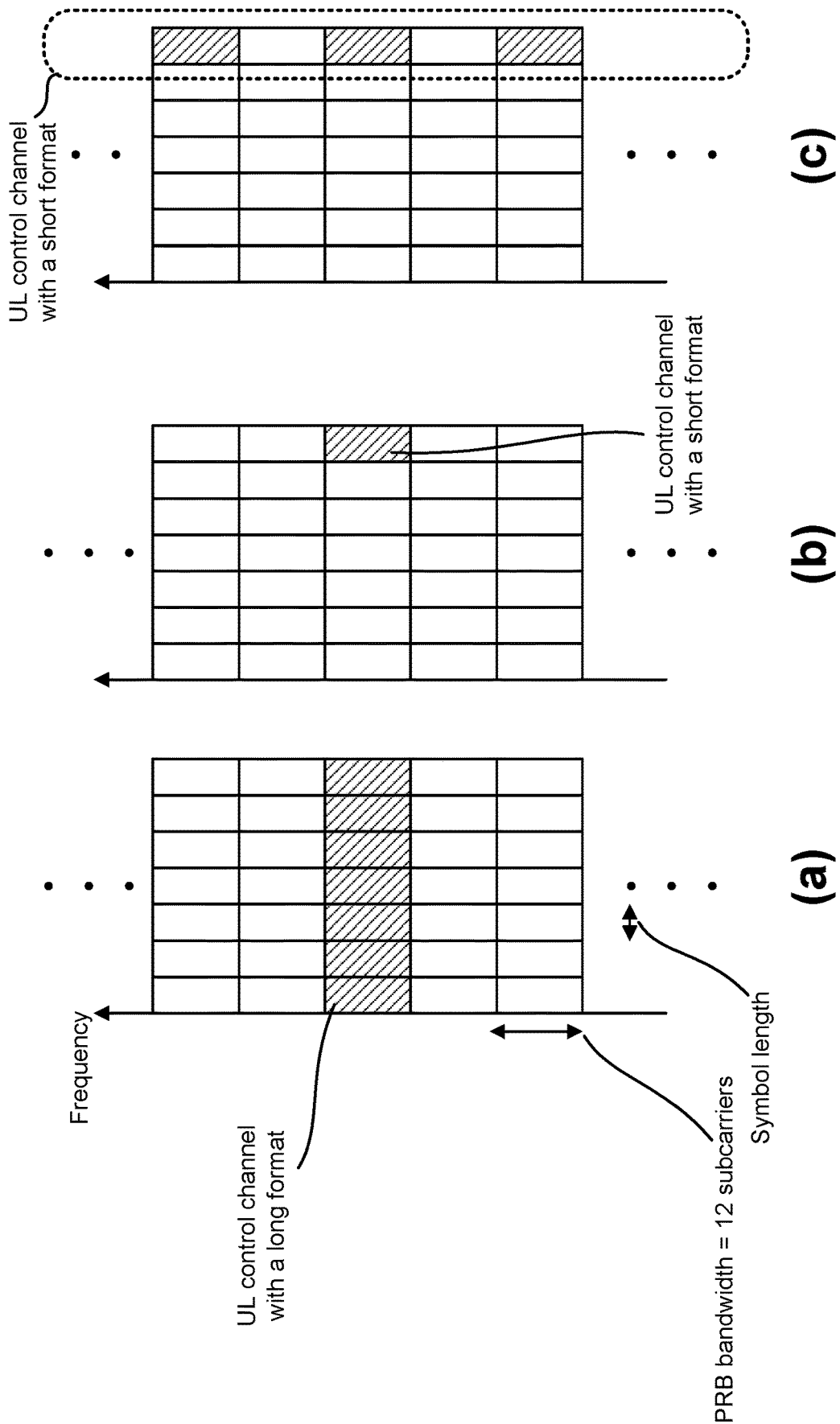
FIG. 10 shows examples of uplink (UL) control channel structures.

FIG. 10 shows examples of UL control channel structures. UL control channel may be mapped on REs which are defined a PRB and a slot in frequency and time domains, respectively. This UL control channel may be referred to as a long format (or just the 1st format). UL control channels may be mapped on REs on a limited OFDM symbols in time domain. This may be referred to as a short format (or just the 2nd format). The UL control channels with a short format may be mapped on REs within a single PRB. Alternatively, the UL control channels with a short format may be mapped on REs within multiple PRBs. For example, interlaced mapping may be applied, namely the UL control channel may be mapped to every N PRBs (e.g. 5 or 10) within a system bandwidth.

Figure 11:
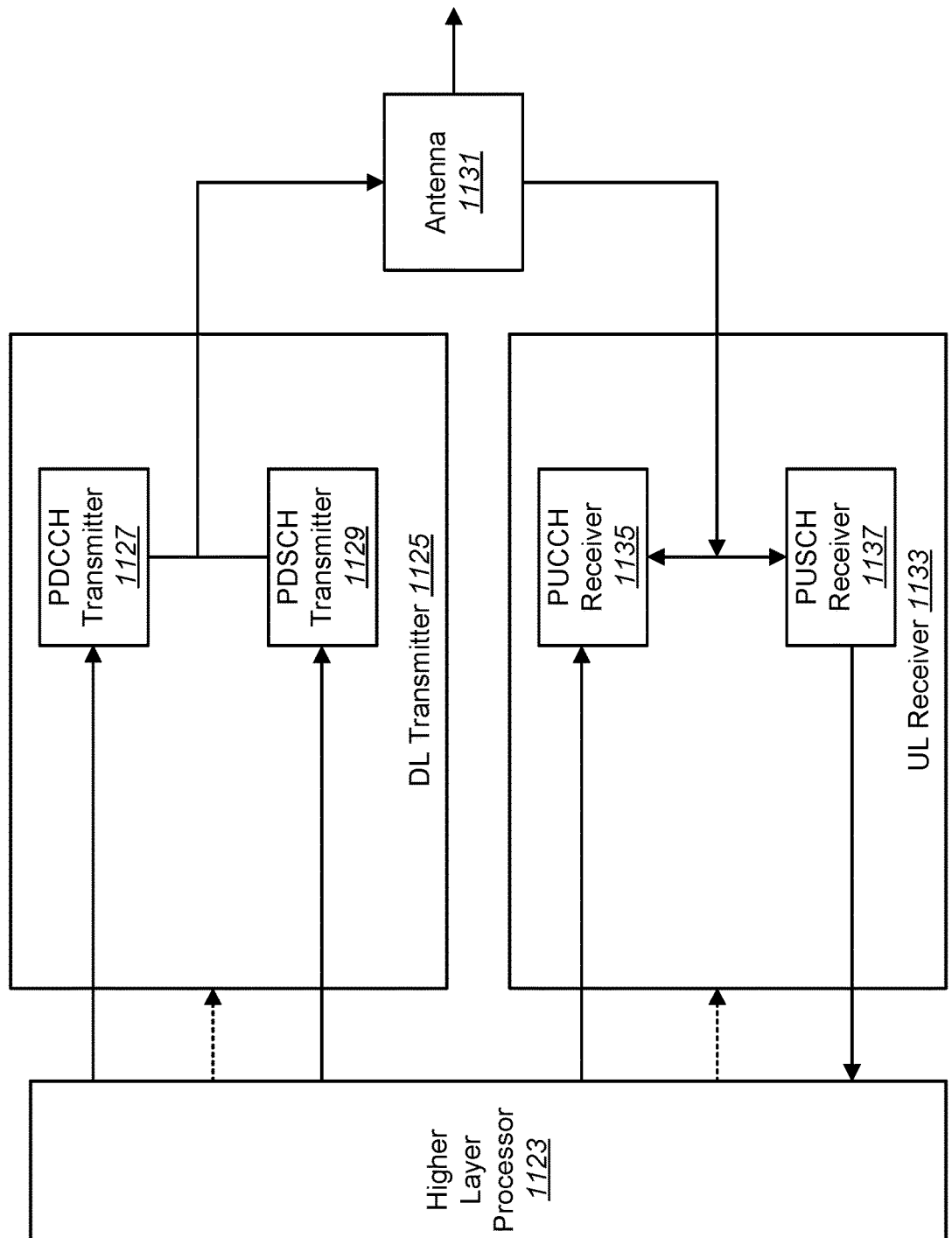
FIG. 11 is a block diagram illustrating one implementation of a gNB.

FIG. 11 is a block diagram illustrating one implementation of an gNB 1160. The gNB 1160 may include a higher layer processor 1123, a DL transmitter 1125, a UL receiver 1133, and one or more antenna 1131. The DL transmitter 1125 may include a PDCCH transmitter 1127 and a PDSCH transmitter 1129. The UL receiver 1133 may include a PUCCH receiver 1135 and a PUSCH receiver 1137.

The higher layer processor 1123 may manage physical layer's behaviors (the DL transmitter's and the UL receiver's behaviors) and provide higher layer parameters to the physical layer. The higher layer processor 1123 may obtain transport blocks from the physical layer. The higher layer processor 1123 may send/acquire higher layer messages such as an RRC message and MAC message to/from a UE's higher layer. The higher layer processor 1123 may provide the PDSCH transmitter transport blocks and provide the PDCCH transmitter transmission parameters related to the transport blocks.

The DL transmitter 1125 may multiplex downlink physical channels and downlink physical signals (including reservation signal) and transmit them via transmission antennas 1131. The UL receiver 1133 may receive multiplexed uplink physical channels and uplink physical signals via receiving antennas 1131 and de-multiplex them. The PUCCH receiver 1135 may provide the higher layer processor 1123 UCI. The PUSCH receiver 1137 may provide the higher layer processor 1123 received transport blocks.

Figure 12:
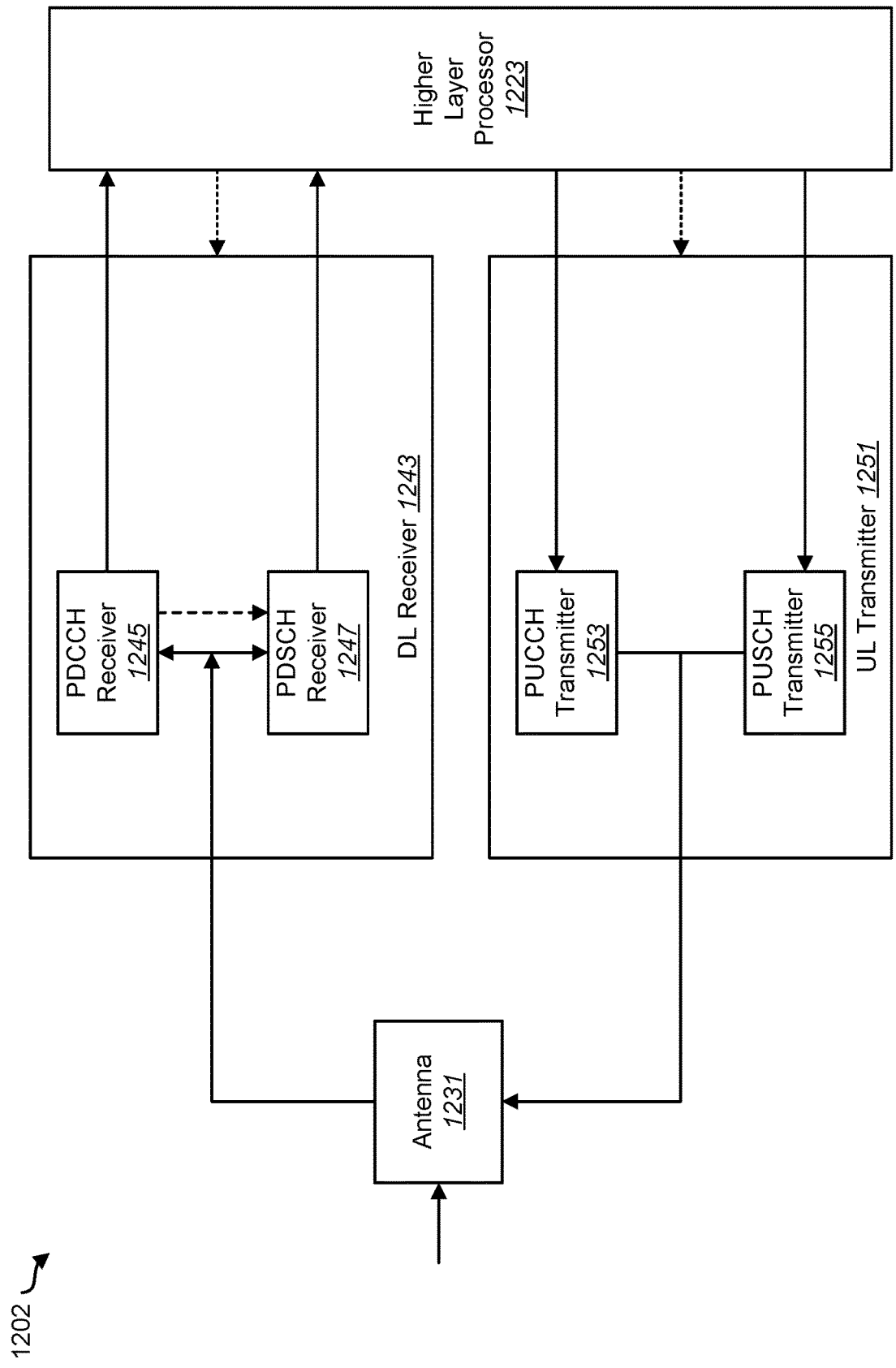
FIG. 12 is a block diagram illustrating one implementation of a UE.

FIG. 12 is a block diagram illustrating one implementation of a UE 1202. The UE 1202 may include a higher layer processor 1223, a UL transmitter 1251, a DL receiver 1243, and one or more antenna 1231. The UL transmitter 1251 may include a PUCCH transmitter 1253 and a PUSCH transmitter 1255. The DL receiver 1243 may include a PDCCH receiver 1245 and a PDSCH receiver 1247.

The higher layer processor 1223 may manage physical layer's behaviors (the UL transmitter's and the DL receiver's behaviors) and provide higher layer parameters to the physical layer. The higher layer processor 1223 may obtain transport blocks from the physical layer. The higher layer processor 1223 may send/acquire higher layer messages such as an RRC message and MAC message to/from a UE's higher layer. The higher layer processor 1223 may provide the PUSCH transmitter transport blocks and provide the PUCCH transmitter 1253 UCI.

The DL receiver 1243 may receive multiplexed downlink physical channels and downlink physical signals via receiving antennas 1231 and de-multiplex them. The PDCCH receiver 1245 may provide the higher layer processor 1223 DCI. The PDSCH receiver 1247 may provide the higher layer processor 1223 received transport blocks.

It should be noted that names of physical channels described herein are examples. The other names such as "NRPDCCH, NRPDSCH, NRPUCCH and NRPUSCH", "new Generation-(G)PDCCH, GPDSCH, GPUCCH and GPUSCH" or the like can be used.

FIG. 13 illustrates examples of two demodulation reference signals (DMRS) 1301 in every 7 symbols for normal cyclic prefix (NCP) or 6 symbols for extended cyclic prefix (ECP). A first DMRS pattern (Pattern 1) 1303 includes 2 RS in every 7 or 6 symbols. With this pattern, a long PUCCH format has 2 DMRS 1301 in every 7 symbols for normal CP (NCP), and 2 DMRS 1301 in every 6 symbols for extended CP (ECP) within a slot.

A first example (a) shows a DMRS pattern 1 1303*a* for Normal cyclic prefix (CP). A second example (b) shows a DMRS pattern 1 1303*b* for extended CP.

FIG. 14 illustrates examples of one DMRS 1401 in every 7 symbols for NCP or 6 symbols for ECP. A second DMRS pattern (Pattern 2) 1403 includes one RS in every 7 or 6 symbols. With this pattern, a long PUCCH format has 1 DMRS 1401 in every 7 symbols for normal CP (NCP), and 1 DMRS 1401 in every 6 symbols for extended CP (ECP) within a slot.

A first example (a) shows a DMRS pattern 2 1403*a* for Normal cyclic prefix (CP). A second example (b) shows a DMRS pattern 2 1403*b* for extended CP.

FIG. 15 illustrates examples of RS patterns with frequency division multiplexing (FDM) among UEs for two DMRS in every 7 symbols for NCP. Different UEs 102 are assigned with different RS patterns that are not overlapping with other UEs 102. FIG. 15 shows several examples of RS multiplexing for different UEs 102 with pattern 1 where two RS symbols are used in every 7 symbols for NCP. Different UEs 102 are assigned with different subcarriers for RS transmission in the two DMRS symbols. In the Figures, each crosshatch represents the DMRS of a different UE.

In implementation (a), a UE 102 may be configured with 2 subcarriers for RS transmission within each DMRS symbol. Thus, an RB can be multiplexed with 6 UEs 102.

In implementation (b), a UE 102 may be configured with 3 subcarriers for RS transmission within each DMRS symbol. Thus, an RB can be multiplexed with 4 UEs 102.

In implementation (c), a UE 102 may be configured with 4 subcarriers for RS transmission within each DMRS symbol. Thus, an RB can be multiplexed with 3 UEs 102.

In implementation (d), a UE may be configured with 6 subcarriers for RS transmission within each DMRS symbol. Thus, an RB can be multiplexed with 2 UEs 102.

FIG. 16 illustrates examples of RS patterns with FDM among UEs for two DMRS in every 6 symbols for ECP. Different UEs 102 are assigned with different RS patterns that are not overlapping with other UEs 102. FIG. 16 shows several examples of RS multiplexing for different UEs 102 with pattern 1 where two RS symbols are used in every 6 symbols for ECP. Different UEs 102 are assigned with different subcarriers for RS transmission in the two DMRS symbols.

In implementation (a), a UE 102 may be configured with 2 subcarriers for RS transmission within each DMRS symbol. Thus, an RB can be multiplexed with 6 UEs 102.

In implementation (b), a UE 102 may be configured with 3 subcarriers for RS transmission within each DMRS symbol. Thus, an RB can be multiplexed with 4 UEs 102.

In implementation (c), a UE 102 may be configured with 4 subcarriers for RS transmission within each DMRS symbol. Thus, an RB can be multiplexed with 3 UEs 102.

In implementation (d), a UE may be configured with 6 subcarriers for RS transmission within each DMRS symbol. Thus, an RB can be multiplexed with 2 UEs 102.

FIG. 17 illustrates examples of a shifted RS pattern with FDM among UEs for two DMRS in every 7 symbols for NCP. For CP-OFDM based transmission with 2 RS symbols in each 7 symbols for NCP and every 6 symbols for ECP, the RS can also be located at the beginning. Thus, a shifted RS pattern can be applied.

In implementation (a), a UE 102 may be configured with 2 subcarriers for RS transmission within each DMRS symbol. Thus, an RB can be multiplexed with 6 UEs 102.

In implementation (b), a UE 102 may be configured with 3 subcarriers for RS transmission within each DMRS symbol. Thus, an RB can be multiplexed with 4 UEs 102.

In implementation (c), a UE 102 may be configured with 4 subcarriers for RS transmission within each DMRS symbol. Thus, an RB can be multiplexed with 3 UEs 102.

In implementation (d), a UE may be configured with 6 subcarriers for RS transmission within each DMRS symbol. Thus, an RB can be multiplexed with 2 UEs 102.

FIG. 18 illustrates examples of long PUCCH with one DMRS every 7 symbols for NCP. The same FDM combinations can be used on the pattern with a single RS symbol in every 7 symbols for NCP and every 6 symbols for ECP. In this case, the RS position should be the same as in DFT-S-OFDM based transmission, and no shift of RS position is needed. FIG. 18 shows several examples for a long PUCCH with a single DMRS in every 7 symbols for NCP with different UE multiplexing capabilities.

In implementation (a), a UE 102 may be configured with 2 subcarriers for RS transmission within each DMRS symbol. Thus, an RB can be multiplexed with 6 UEs 102.

In implementation (b), a UE 102 may be configured with 3 subcarriers for RS transmission within each DMRS symbol. Thus, an RB can be multiplexed with 4 UEs 102.

In implementation (c), a UE 102 may be configured with 4 subcarriers for RS transmission within each DMRS symbol. Thus, an RB can be multiplexed with 3 UEs 102.

In implementation (d), a UE may be configured with 6 subcarriers for RS transmission within each DMRS symbol. Thus, an RB can be multiplexed with 2 UEs 102.

FIG. 19 illustrates examples of DMRS allocation at frequency domain. FIG. 19 shows several examples of DMRS spreads in the frequency domain. A first example is for 2 RS per RB. A second example is for 3 RS per RB. A third example is for 4 RS per RB.

FIG. 20 illustrates examples of UE multiplexing with different DMRS patterns. FIG. 20 shows several examples where four UEs 102 are multiplexed with different DMRS patterns. In FIG. 20, each crosshatch represents the DMRS pattern of a given UE 102. In FIG. 20, each crosshatch represents the DMRS pattern of a given UE 102.

A first example (a) is for two RS per RB in the frequency domain. A second example (b) is for three RS per RB in the frequency domain. A third example (c) is for four RS per RB in the frequency domain.

FIG. 21 illustrates examples of frequency hopping for long PUCCH formats. To provide frequency diversity, frequency hopping of a long PUCCH can be configured. In this case, separate PUCCH regions or subbands should be configured for a UE 102, and the PUCCH can be transmitted with frequency hopping in different regions/subbands, as shown in FIG. 21.

A first example (a) illustrates frequency hopping at slot level or every 7 symbols for NCP. A second example (b) illustrates frequency hopping within 7 symbols for NCP.

FIG. 22 illustrates examples of self-contained DMRS patterns in each symbol. The UE multiplexing within a RB can be reduced or eliminated. Furthermore, DMRS of 1 symbol short PUCCH can be used in each symbol. FIG. 22 shows the reference signal pattern designs for 2 RS, 3 RS, 4 RS and 6 RS per RB. For each RS setting, at least two patterns can be defined, denoted as pattern 1 and pattern 2.

Figure 23:
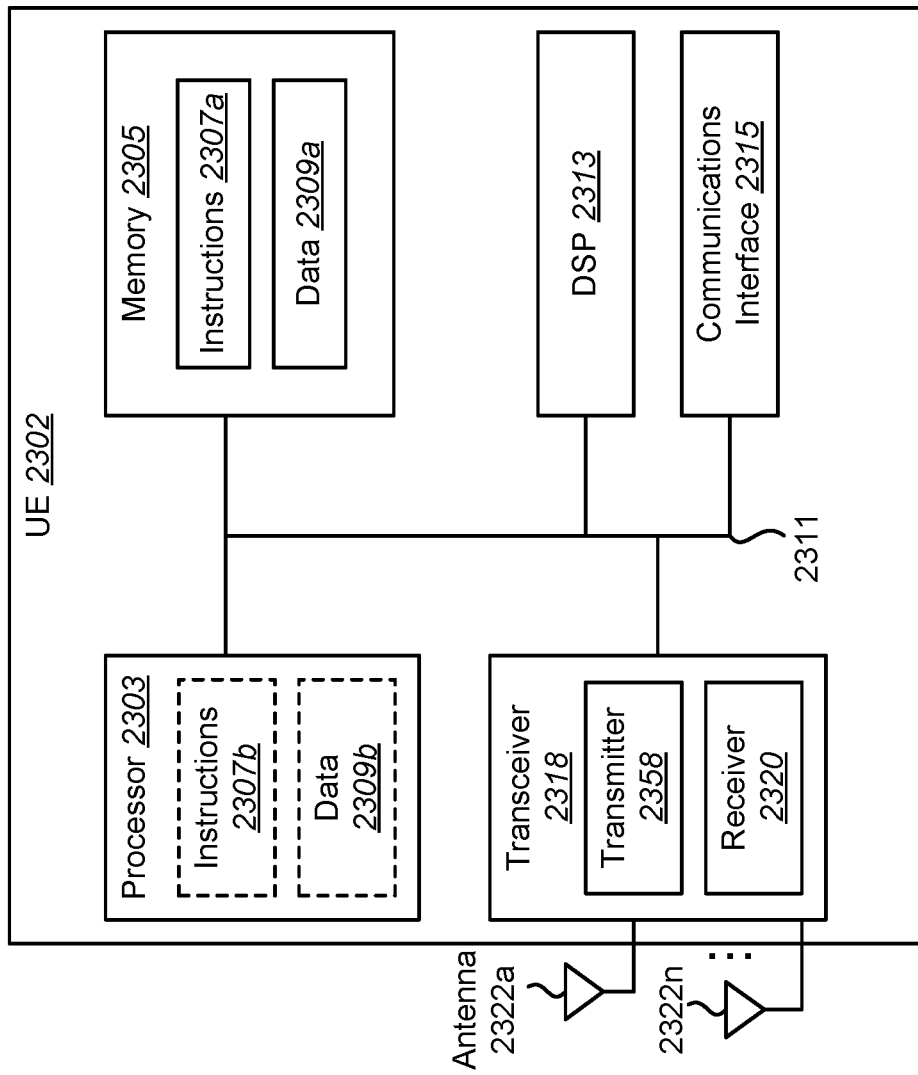
FIG. 23 illustrates various components that may be utilized in a UE.

FIG. 23 illustrates various components that may be utilized in a UE 2302. The UE 2302 described in connection with FIG. 23 may be implemented in accordance with the UE 102 described in connection with FIG. 1. The UE 2302 includes a processor 2303 that controls operation of the UE 2302. The processor 2303 may also be referred to as a central processing unit (CPU). Memory 2305, which may include read-only memory (ROM), random access memory (RAM), a combination of the two or any type of device that may store information, provides instructions 2307a and data 2309a to the processor 2303. A portion of the memory 2305 may also include non-volatile random access memory (NVRAM). Instructions 2307b and data 2309b may also reside in the processor 2303. Instructions 2307b and/or data 2309b loaded into the processor 2303 may also include instructions 2307a and/or data 2309a from memory 2305 that were loaded for execution or processing by the processor 2303. The instructions 2307b may be executed by the processor 2303 to implement the methods described above.

The UE 2302 may also include a housing that contains one or more transmitters 2358 and one or more receivers 2320 to allow transmission and reception of data. The transmitter(s) 2358 and receiver(s) 2320 may be combined into one or more transceivers 2318. One or more antennas 2322a-n are attached to the housing and electrically coupled to the transceiver 2318.

The various components of the UE 2302 are coupled together by a bus system 2311, which may include a power bus, a control signal bus and a status signal bus, in addition to a data bus. However, for the sake of clarity, the various buses are illustrated in FIG. 23 as the bus system 2311. The UE 2302 may also include a digital signal processor (DSP) 2313 for use in processing signals. The UE 2302 may also include a communications interface 2315 that provides user access to the functions of the UE 2302. The UE 2302 illustrated in FIG. 23 is a functional block diagram rather than a listing of specific components.

Figure 24:
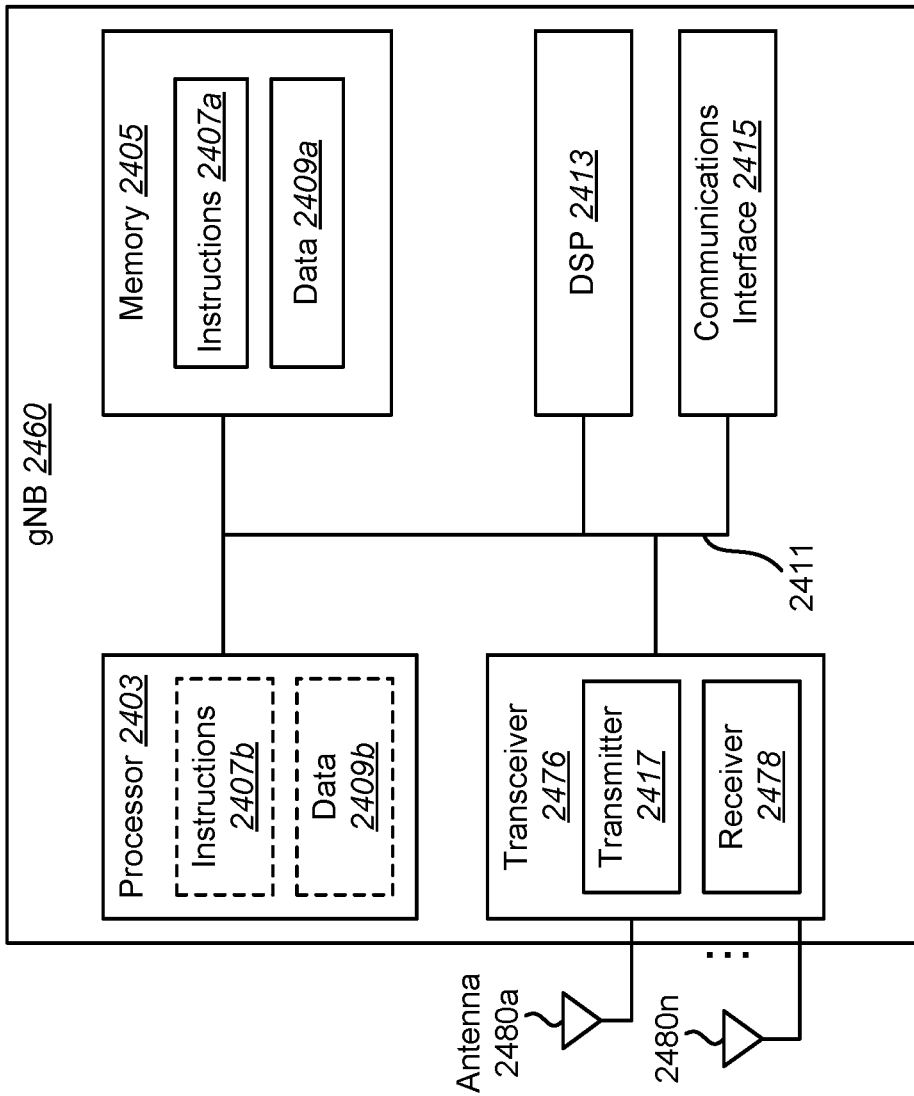
FIG. 24 illustrates various components that may be utilized in a gNB.

FIG. 24 illustrates various components that may be utilized in a gNB 2460. The gNB 2460 described in connection with FIG. 24 may be implemented in accordance with the gNB 160 described in connection with FIG. 1. The gNB 2460 includes a processor 2403 that controls operation of the gNB 2460. The processor 2403 may also be referred to as a central processing unit (CPU). Memory 2405, which may include read-only memory (ROM), random access memory (RAM), a combination of the two or any type of device that may store information, provides instructions 2407a and data 2409a to the processor 2403. A portion of the memory 2405 may also include non-volatile random access memory (NVRAM). Instructions 2407b and data 2409b may also reside in the processor 2403. Instructions 2407b and/or data 2409b loaded into the processor 2403 may also include instructions 2407a and/or data 2409a from memory 2405 that were loaded for execution or processing by the processor 2403. The instructions 2407b may be executed by the processor 2403 to implement the methods described above.

The gNB 2460 may also include a housing that contains one or more transmitters 2417 and one or more receivers 2478 to allow transmission and reception of data. The transmitter(s) 2417 and receiver(s) 2478 may be combined into one or more transceivers 2476. One or more antennas 2480a-n are attached to the housing and electrically coupled to the transceiver 2476.

The various components of the gNB 2460 are coupled together by a bus system 2411, which may include a power bus, a control signal bus and a status signal bus, in addition to a data bus. However, for the sake of clarity, the various buses are illustrated in FIG. 24 as the bus system 2411. The gNB 2460 may also include a digital signal processor (DSP) 2413 for use in processing signals. The gNB 2460 may also include a communications interface 2415 that provides user access to the functions of the gNB 2460. The gNB 2460 illustrated in FIG. 24 is a functional block diagram rather than a listing of specific components.

Figure 25:
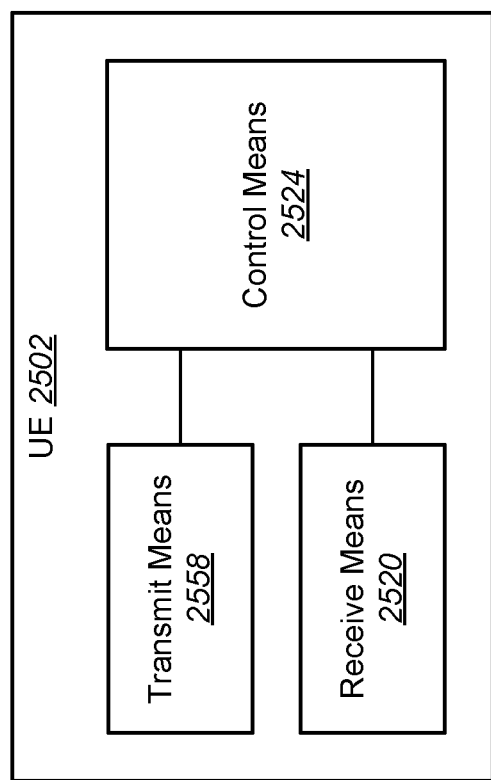
FIG. 25 is a block diagram illustrating one implementation of a UE in which systems and methods for long PUCCH design for 5G NR operations may be implemented.

FIG. 25 is a block diagram illustrating one implementation of a UE 2502 in which systems and methods for a long PUCCH design for 5G NR operations may be implemented. The UE 2502 includes transmit means 2558, receive means 2520 and control means 2524. The transmit means 2558, receive means 2520 and control means 2524 may be configured to perform one or more of the functions described in connection with FIG. 1 above. FIG. 23 above illustrates one example of a concrete apparatus structure of FIG. 25. Other various structures may be implemented to realize one or more of the functions of FIG. 1. For example, a DSP may be realized by software.

Figure 26:
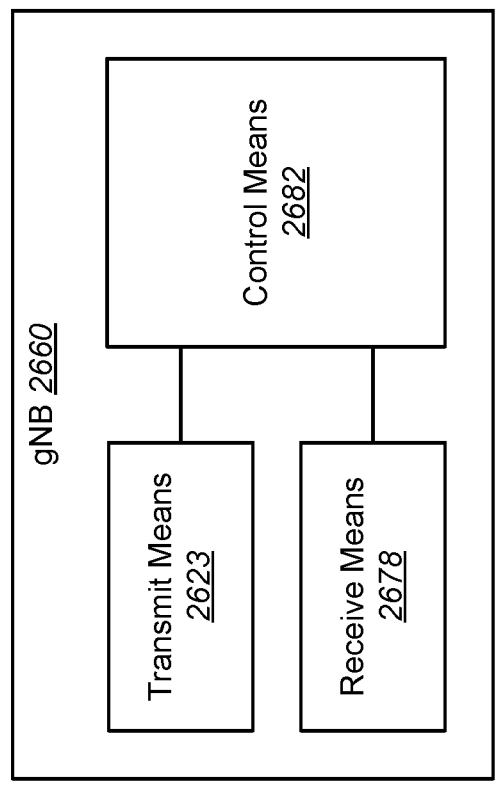
FIG. 26 is a block diagram illustrating one implementation of a gNB in which systems and methods for long PUCCH design for 5G NR operations may be implemented.

FIG. 26 is a block diagram illustrating one implementation of a gNB 2660 in which systems and methods for a long PUCCH design for 5G NR operations may be implemented. The gNB 2660 includes transmit means 2617, receive means 2678 and control means 2682. The transmit means 2617, receive means 2678 and control means 2682 may be configured to perform one or more of the functions described in connection with FIG. 1 above. FIG. 22 above illustrates one example of a concrete apparatus structure of FIG. 26. Other various structures may be implemented to realize one or more of the functions of FIG. 1. For example, a DSP may be realized by software.

Figure 27:
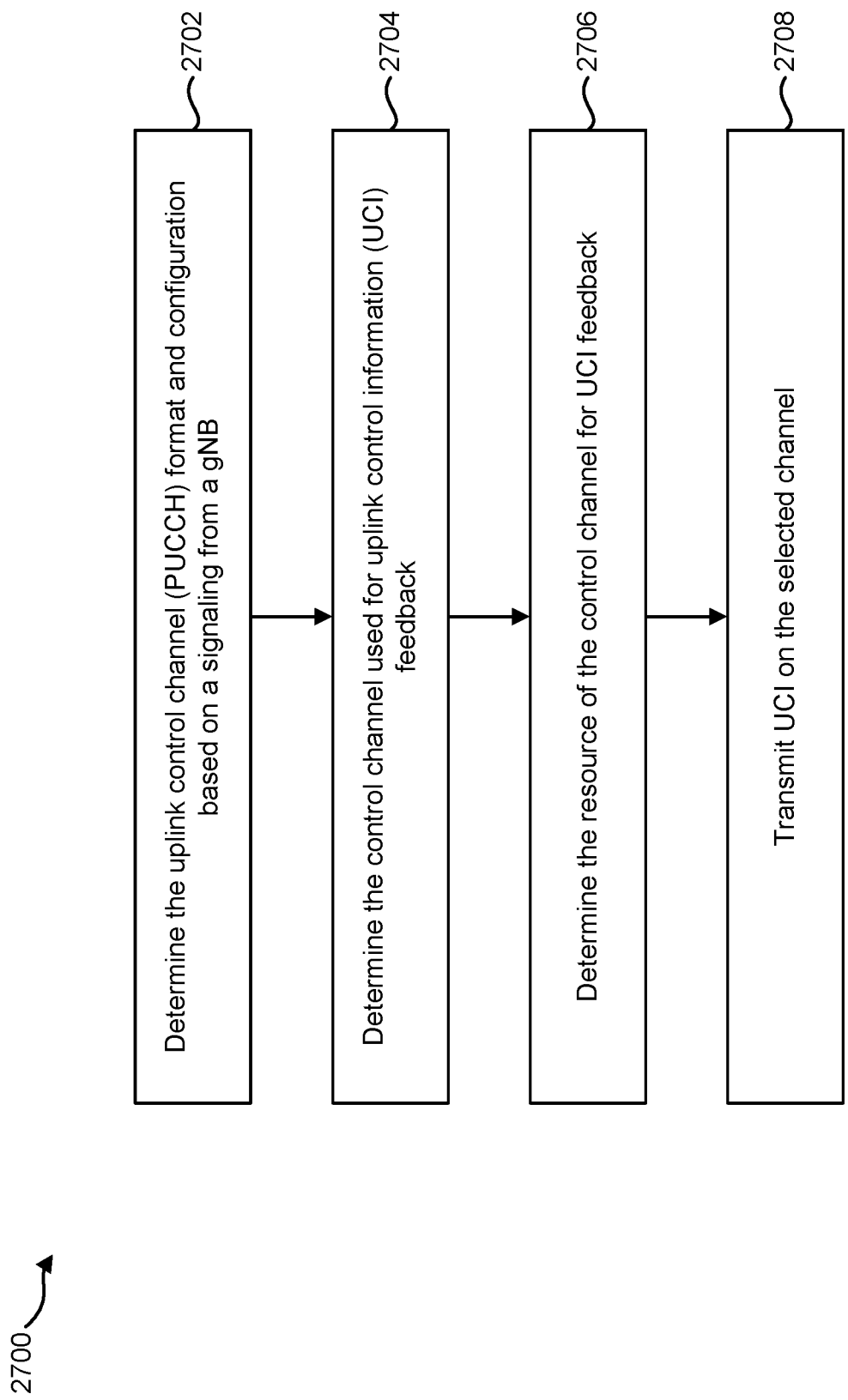
FIG. 27 is a flow diagram illustrating a method for implementing a long PUCCH design for 5G NR.

FIG. 27 is a flow diagram illustrating a method 2700 for implementing a long PUCCH design for 5G NR. The method 2700 may be implemented by a UE 102. The UE 102 may determine 2702 the uplink control channel (PUCCH) format and configuration based on a signaling from a gNB 160. For example, the PUCCH format and configuration may include at least a short PUCCH format and a long PUCCH format. The short PUCCH format and long PUCCH format may have the same or different waveforms and/or numerologies.

A long PUCCH may employ a format that comprises a waveform, a number of resource blocks (RBs), a reference symbol (RS) pattern, and/or orthogonal sequences on RS and data symbols, and/or one or more control resource regions. The long PUCCH may employ a cyclic prefix Orthogonal Frequency Division Multiplexing (CP-OFDM) or discrete Fourier transform spread OFDM (DFT-S-OFDM) waveform.

A common framework may be used on the RS location and UCI multiplexing methods. RS symbols may be allocated at time domain, and orthogonal sequences may be applied for UCI data at time domain or frequency domain.

If CP-OFDM is used, RS symbols may be allocated at frequency domain, and orthogonal sequences may be applied for UCI data at time domain or frequency domain. If CP-OFDM is used, orthogonal RS patterns may be applied for UE multiplexing.

The UE 102 may determine 2704 the control channel used for uplink control information (UCI) feedback. The UE 102 may determine 2706 the resource of the control channel for UCI feedback. The UE 102 may transmit 2708 UCI on the selected channel.

Figure 28:
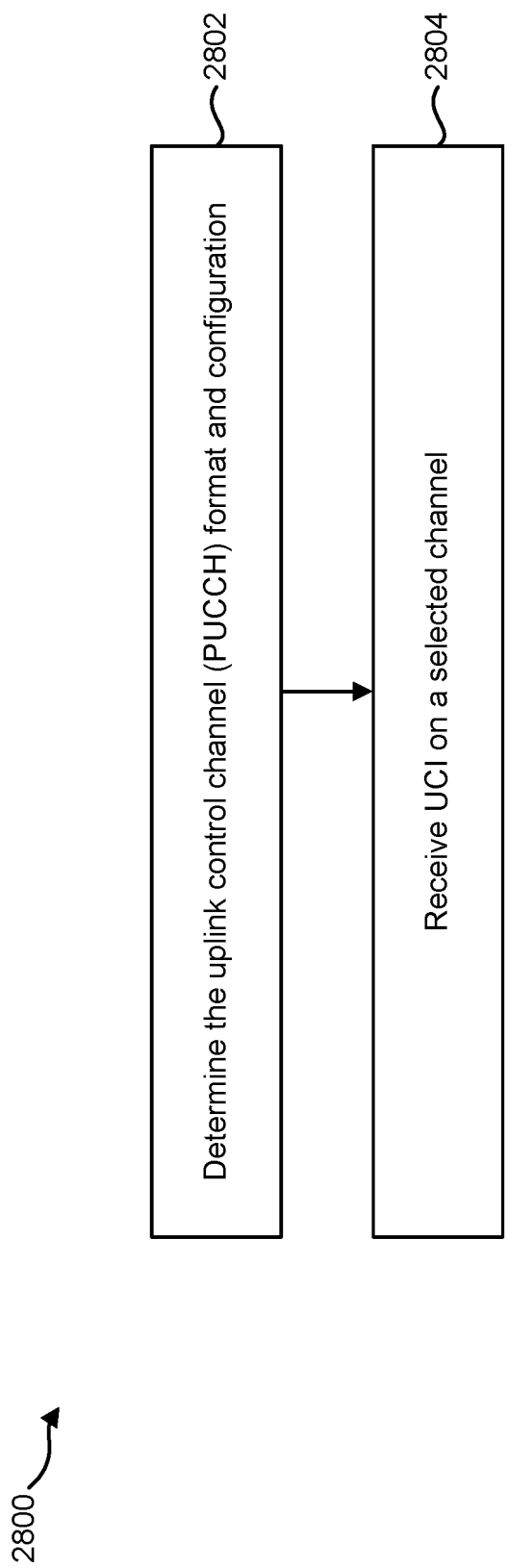
FIG. 28 is a flow diagram illustrating another method for implementing a long PUCCH design for 5G NR.

FIG. 28 is a flow diagram illustrating a method 2800 for implementing a long PUCCH design for 5G NR. The method 2800 may be implemented by a base station (gNB) 160. The gNB 160 may determine 2802 the uplink control channel (PUCCH) format and configuration. For example, the PUCCH format and configuration may include at least a short PUCCH format and a long PUCCH format. The short PUCCH format and long PUCCH format may have the same or different waveforms and/or numerologies.

A long PUCCH may employ a format that comprises a waveform, a number of resource blocks (RBs), a reference symbol (RS) pattern, and/or orthogonal sequences on RS and data symbols, and/or one or more control resource regions. The long PUCCH may employ a cyclic prefix Orthogonal Frequency Division Multiplexing (CP-OFDM) or discrete Fourier transform spread OFDM (DFT-S-OFDM) waveform.

A common framework may be used on the RS location and UCI multiplexing methods. RS symbols may be allocated at time domain, and orthogonal sequences may be applied for UCI data at time domain or frequency domain.

If CP-OFDM is used, RS symbols may be allocated at frequency domain, and orthogonal sequences may be applied for UCI data at time domain or frequency domain. If CP-OFDM is used, orthogonal RS patterns may be applied for UE multiplexing.

The gNB 160 may receive 2804 UCI on a selected channel. A control channel used for uplink control information (UCI) feedback and a resource of the control channel for UCI feedback are determined by a UE 102 based on signaling from the gNB 160.

Figure 29:
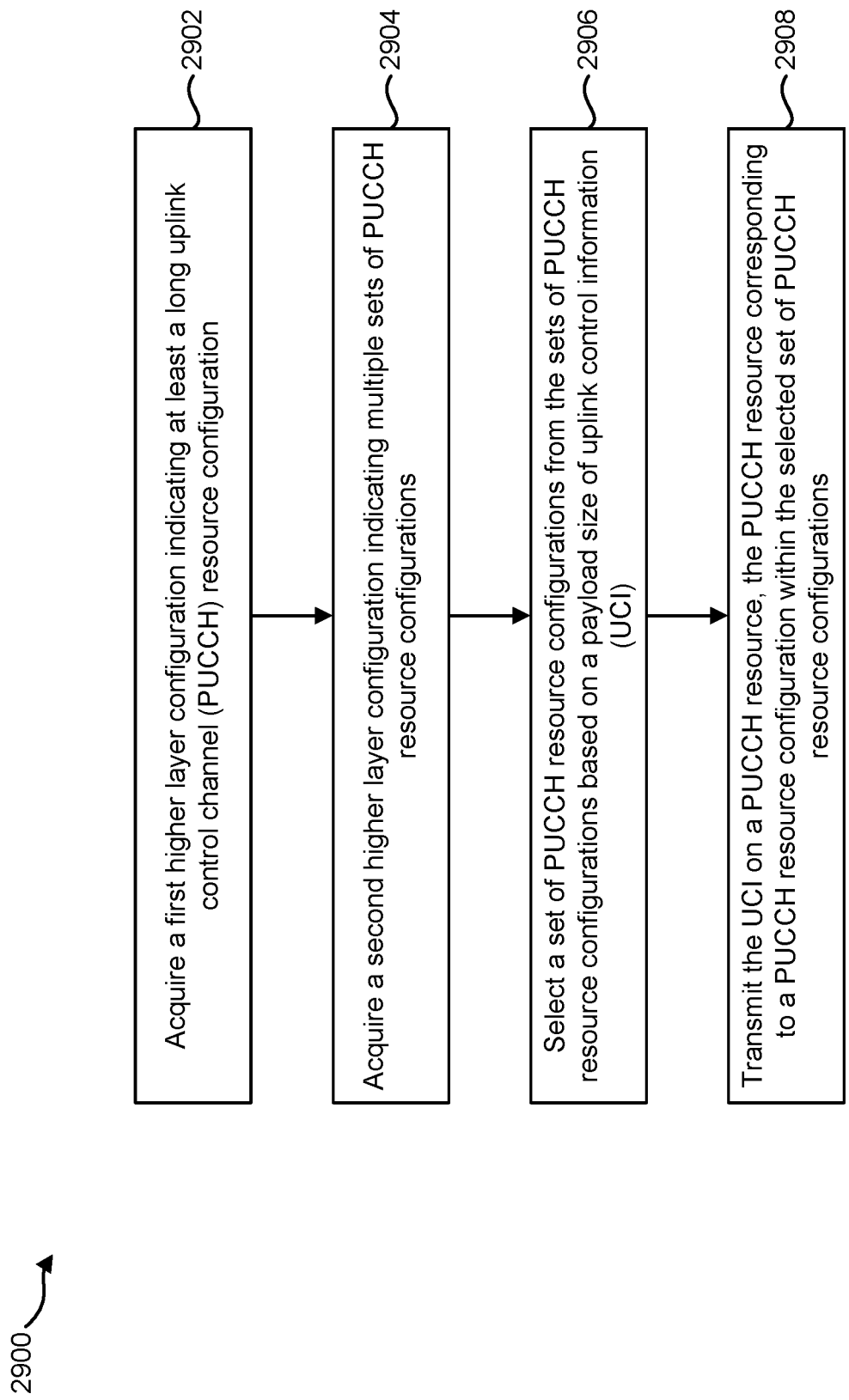
FIG. 29 is a flow diagram illustrating another method for implementing a long PUCCH design for 5G NR.

FIG. 29 is a flow diagram illustrating another method 2900 for implementing a long PUCCH design for 5G NR. The method 2900 may be implemented by a UE 102.

The UE 102 may acquire 2902 a first higher layer configuration indicating at least a long uplink control channel (PUCCH) resource configuration. The first higher layer configuration may include at least a number of symbols, a number of resource blocks (RBs), and whether frequency hopping is applied.

The UE 102 may acquire 2904 a second higher layer configuration indicating multiple sets of PUCCH resource configurations. One set of PUCCH resource configurations within the multiple sets of PUCCH resource configurations may include the long PUCCH resource configuration.

The UE 102 may select 2906 a set of PUCCH resource configurations from the sets of PUCCH resource configurations based on a payload size of uplink control information (UCI). The UE 102 may transmit 2908 the UCI on a PUCCH resource, the PUCCH resource corresponding to a PUCCH resource configuration within the selected set of PUCCH resource configurations. If a long PUCCH spans over multiple slots and if an inter-slot frequency hopping is configured, the inter-slot frequency hopping may be applied at every slot boundary.

Figure 30:
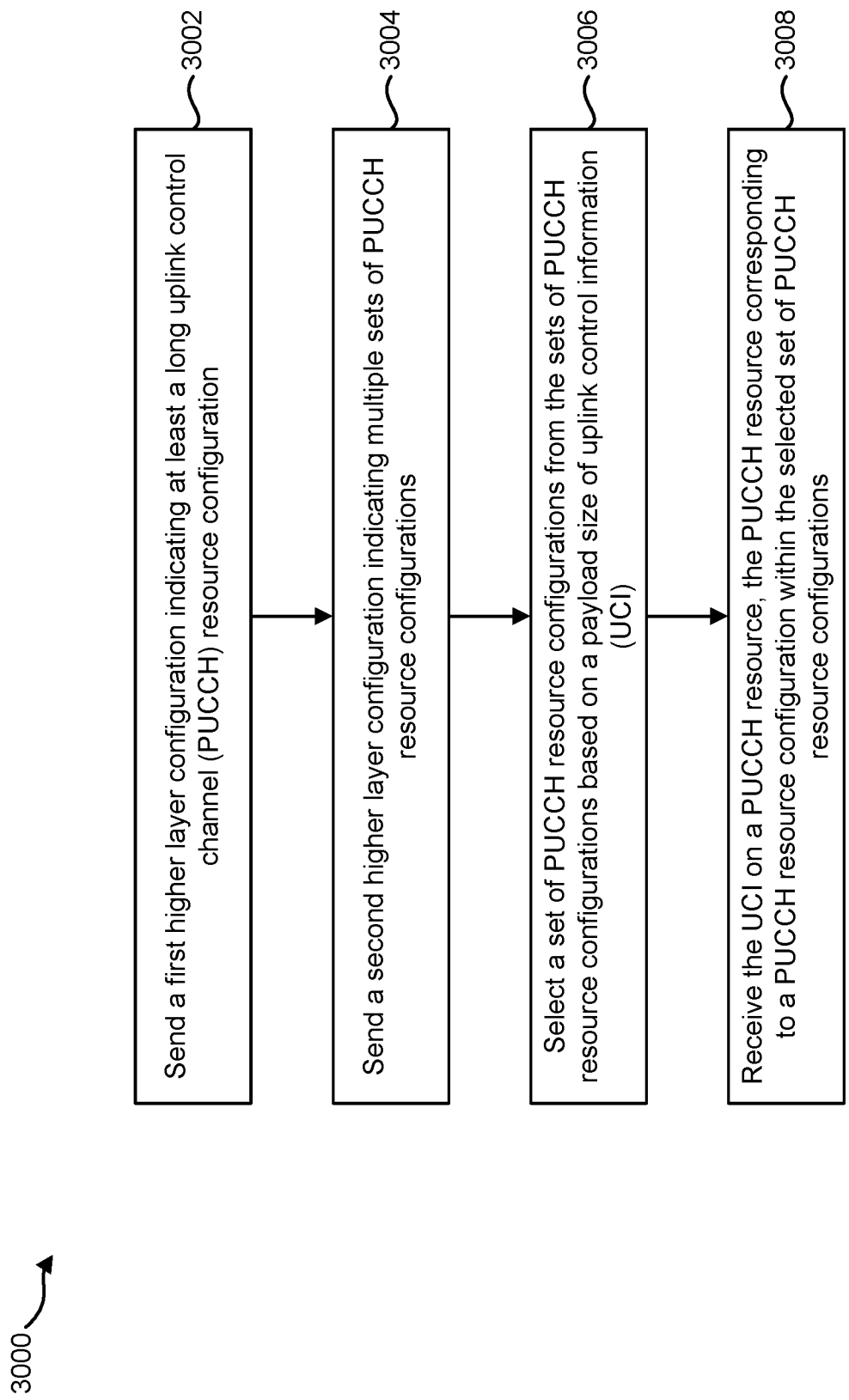
FIG. 30 is a flow diagram illustrating another method for implementing a long PUCCH design for 5G NR.

FIG. 30 is a flow diagram illustrating another method 3000 for implementing a long PUCCH design for 5G NR. The method 3000 may be implemented by a base station (gNB) 160.

The gNB 160 may send 3002 a first higher layer configuration indicating at least a long uplink control channel (PUCCH) resource configuration. The first higher layer configuration may include at least a number of symbols, a number of resource blocks (RBs), and whether frequency hopping is applied.

The gNB 160 may send 3004 a second higher layer configuration indicating multiple sets of PUCCH resource configurations. One set of PUCCH resource configurations within the multiple sets of PUCCH resource configurations may include the short PUCCH resource configuration.

The gNB 160 may select 3006 a set of PUCCH resource configurations from the sets of PUCCH resource configurations based on a payload size of uplink control information (UCI). The gNB 160 may receive 3008 the UCI on a PUCCH resource, the PUCCH resource corresponding to a PUCCH resource configuration within the selected set of PUCCH resource configurations. If a long PUCCH spans over multiple slots and if an inter-slot frequency hopping is configured, the inter-slot frequency hopping may be applied at every slot boundary.

The term "computer-readable medium" refers to any available medium that can be accessed by a computer or a processor. The term "computer-readable medium," as used herein, may denote a computer- and/or processor-readable medium that is non-transitory and tangible. By way of example, and not limitation, a computer-readable or processor-readable medium may comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer or processor. Disk and disc, as used herein, includes compact disc (CD), laser disc, optical disc, digital versatile disc (DVD), floppy disk and Blu-Ray® disc where disks usually reproduce data magnetically, while discs reproduce data optically with lasers.

It should be noted that one or more of the methods described herein may be implemented in and/or performed using hardware. For example, one or more of the methods described herein may be implemented in and/or realized using a chipset, an application-specific integrated circuit (ASIC), a large-scale integrated circuit (LSI) or integrated circuit, etc.

Each of the methods disclosed herein comprises one or more steps or actions for achieving the described method. The method steps and/or actions may be interchanged with one another and/or combined into a single step without departing from the scope of the claims. In other words, unless a specific order of steps or actions is required for proper operation of the method that is being described, the order and/or use of specific steps and/or actions may be modified without departing from the scope of the claims.

It is to be understood that the claims are not limited to the precise configuration and components illustrated above. Various modifications, changes and variations may be made in the arrangement, operation and details of the systems, methods, and apparatus described herein without departing from the scope of the claims.

A program running on the gNB 160 or the UE 102 according to the described systems and methods is a program (a program for causing a computer to operate) that controls a CPU and the like in such a manner as to realize the function according to the described systems and methods. Then, the information that is handled in these apparatuses is temporarily stored in a RAM while being processed. Thereafter, the information is stored in various ROMs or HDDs, and whenever necessary, is read by the CPU to be modified or written. As a recording medium on which the program is stored, among a semiconductor (for example, a ROM, a nonvolatile memory card, and the like), an optical storage medium (for example, a DVD, a MO, a MD, a CD, a BD, and the like), a magnetic storage medium (for example, a magnetic tape, a flexible disk, and the like), and the like, any one may be possible. Furthermore, in some cases, the function according to the described systems and methods described above is realized by running the loaded program, and in addition, the function according to the described systems and methods is realized in conjunction with an operating system or other application programs, based on an instruction from the program.

Furthermore, in a case where the programs are available on the market, the program stored on a portable recording medium can be distributed or the program can be transmitted to a server computer that connects through a network such as the Internet. In this case, a storage device in the server computer also is included. Furthermore, some or all of the gNB 160 and the UE 102 according to the systems and methods described above may be realized as an LSI that is a typical integrated circuit. Each functional block of the gNB 160 and the UE 102 may be individually built into a chip, and some or all functional blocks may be integrated into a chip. Furthermore, a technique of the integrated circuit is not limited to the LSI, and an integrated circuit for the functional block may be realized with a dedicated circuit or a general-purpose processor. Furthermore, if with advances in a semiconductor technology, a technology of an integrated circuit that substitutes for the LSI appears, it is also possible to use an integrated circuit to which the technology applies.

Moreover, each functional block or various features of the base station device and the terminal device used in each of the aforementioned embodiments may be implemented or executed by a circuitry, which is typically an integrated circuit or a plurality of integrated circuits. The circuitry designed to execute the functions described in the present specification may comprise a general-purpose processor, a digital signal processor (DSP), an application specific or general application integrated circuit (ASIC), a field programmable gate array (FPGA), or other programmable logic devices, discrete gates or transistor logic, or a discrete hardware component, or a combination thereof. The general-purpose processor may be a microprocessor, or alternatively, the processor may be a conventional processor, a controller, a microcontroller or a state machine. The general-purpose processor or each circuit described above may be configured by a digital circuit or may be configured by an analogue circuit. Further, when a technology of making into an integrated circuit superseding integrated circuits at the present time appears due to advancement of a semiconductor technology, the integrated circuit by this technology is also able to be used.

What is claimed is:

1. A user equipment (UE), comprising:

a processor; and memory in electronic communication with the processor, wherein instructions stored in the memory are executable to:

acquire a first higher layer configuration indicating at least a physical uplink control channel (PUCCH) resource configuration corresponding to a long PUCCH format among a plurality of possible PUCCH formats consisting of short and long PUCCH formats, wherein short is defined as one or two symbols, and wherein long is defined as four or more symbols and configurable in length;

acquire a second higher layer configuration indicating multiple sets of PUCCH resource configurations;

select a set of PUCCH resource configurations from the acquired sets of PUCCH resource configurations based on a payload size of uplink control information (UCI); and transmit the UCI on a PUCCH resource, the PUCCH resource comprising a first PUCCH resource corresponding to a first PUCCH resource configuration within the selected set of PUCCH resource configurations, wherein when (i) the first PUCCH resource corresponds to a first long PUCCH format and spans over multiple slots and (ii) an inter-slot frequency hopping is configured for the long PUCCH format, then (a) the inter-slot frequency hopping is applied per slot for the transmission of the first PUCCH resource, and (b) the first long PUCCH format spans multiple symbols and is transmitted in each slot of the multiple slots.

2. The UE of claim 1, wherein the first higher layer configuration comprises at least a number of symbols, a number of resource blocks (RBs), and whether frequency hopping is applied.

3. The UE of claim 1, wherein the multiple TTIs are contiguous TTIs.

4. The UE of claim 3, wherein symbols occupied by the first long PUCCH format in a TTI of the multiple TTIs are contiguous in time, and symbols occupied by the first long PUCCH format in two neighboring TTIs of the multiple TTIs are not contiguous in time.

5. A method for a user equipment (UE), the method comprising:

acquiring a first higher layer configuration indicating at least a physical uplink control channel (PUCCH) resource configuration corresponding to a long PUCCH format among a plurality of possible PUCCH formats consisting of short and long PUCCH formats, wherein long is defined as four or more symbols and configurable in length, and wherein short is defined as one or two symbols;

acquiring a second higher layer configuration indicating multiple sets of PUCCH resource configurations;

selecting a set of PUCCH resource configurations from the acquired sets of PUCCH resource configurations based on a payload size of uplink control information (UCI); and transmitting the UCI on a PUCCH resource, the PUCCH resource comprising a first PUCCH resource corresponding to a first PUCCH resource configuration within the selected set of PUCCH resource configurations, wherein when (i) the first PUCCH resource corresponds to a first long PUCCH format and spans over multiple slots and (ii) an inter-slot frequency hopping is configured for the first long PUCCH format, then (a) the inter-slot frequency hopping is applied per slot for the transmission of the first PUCCH resource, and (b) the first long PUCCH format spans multiple symbols and is transmitted in each slot of the multiple slots.

6. The method of claim 5, wherein the multiple TTIs are contiguous TTIs.

7. The method of claim 6, wherein symbols occupied by the first long PUCCH format in a TTI of the multiple TTIs are contiguous in time, and symbols occupied by the first long PUCCH format in two neighboring TTIs of the multiple TTIs are not contiguous in time.

8. A base station, comprising:

a processor; and memory in electronic communication with the processor, wherein instructions stored in the memory are executable to:

send a first higher layer configuration indicating at least a physical uplink control channel (PUCCH) resource configuration corresponding to a long PUCCH format among a plurality of possible PUCCH formats consisting of short and long PUCCH formats, wherein short is defined as one or two symbols, wherein long is defined as four or more symbols and configurable in length;

send a second higher layer configuration indicating multiple sets of PUCCH resource configurations; and receive uplink control information (UCI) on a PUCCH resource, the PUCCH resource comprising a first PUCCH resource corresponding to a first PUCCH resource configuration within a set of PUCCH resource configurations selected from the sets of PUCCH resource configurations based on a payload size of the UCI, wherein when (i) the first PUCCH resource corresponds to a first long PUCCH format and spans over multiple transmission time intervals (TTIs) and (ii) an inter-TTI frequency hopping is configured for the first long PUCCH format, then (a) the inter-TTI frequency hopping is applied at every TTI boundary for the transmission of the first PUCCH resource, and (b) the first long PUCCH format is transmitted in each TTI of the multiple TTIs.

9. The base station of claim 8, wherein the multiple TTIs are contiguous TTIs.

10. The base station of claim 9, wherein symbols occupied by the first long PUCCH format in a TTI of the multiple TTIs are contiguous in time, and symbols occupied by the first long PUCCH format in two neighboring TTIs of the multiple TTIs are not contiguous in time.

* * * * *